April 5, 1960

O. C. AAMOT 2,931,708

METALLURGICAL PROCESS AND APPARATUS

Filed July 2, 1954

INVENTOR.
OLAV C. AAMOT
BY Donald F. McCarthy

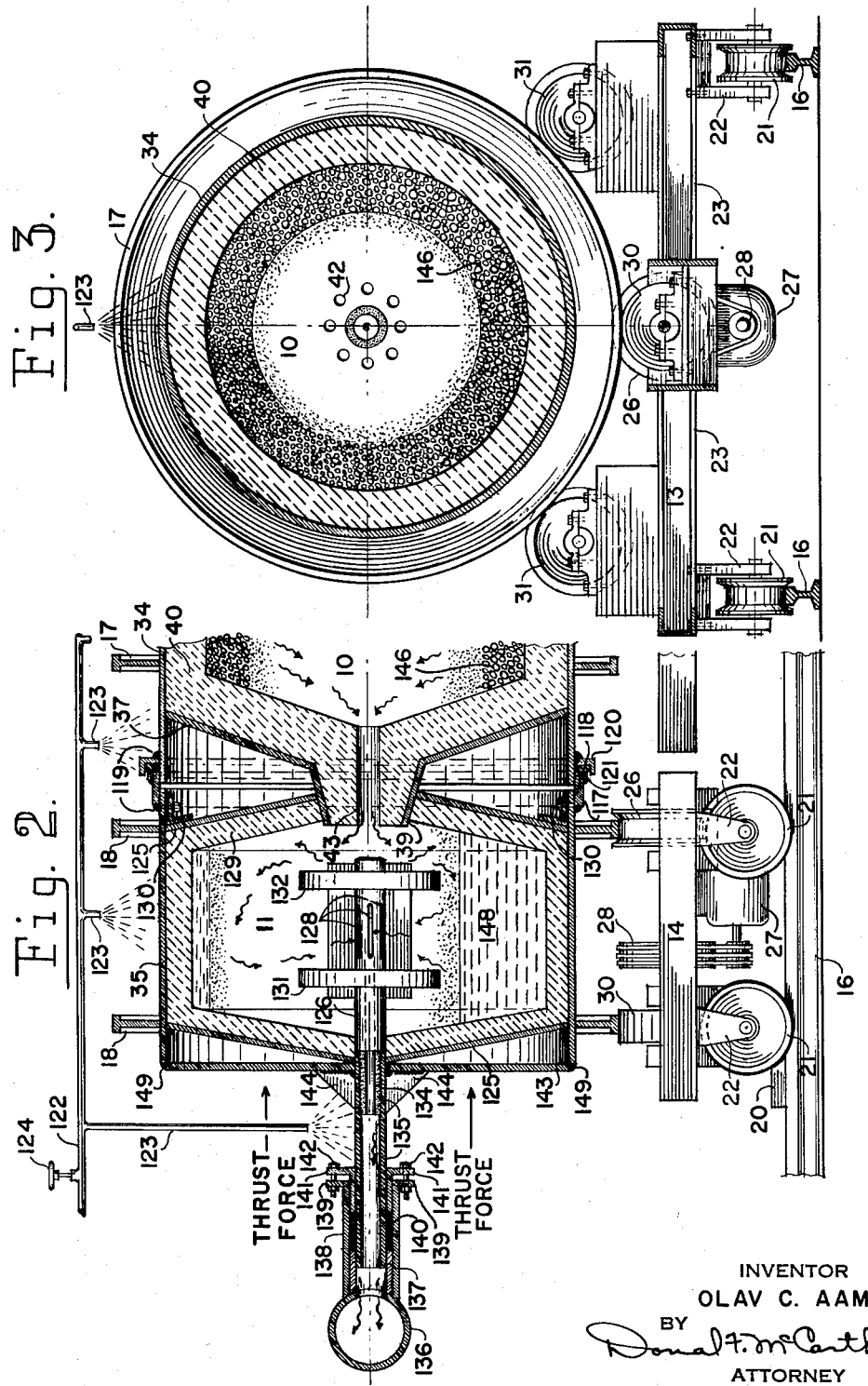

April 5, 1960     O. C. AAMOT     2,931,708
METALLURGICAL PROCESS AND APPARATUS
Filed July 2, 1954     5 Sheets-Sheet 3
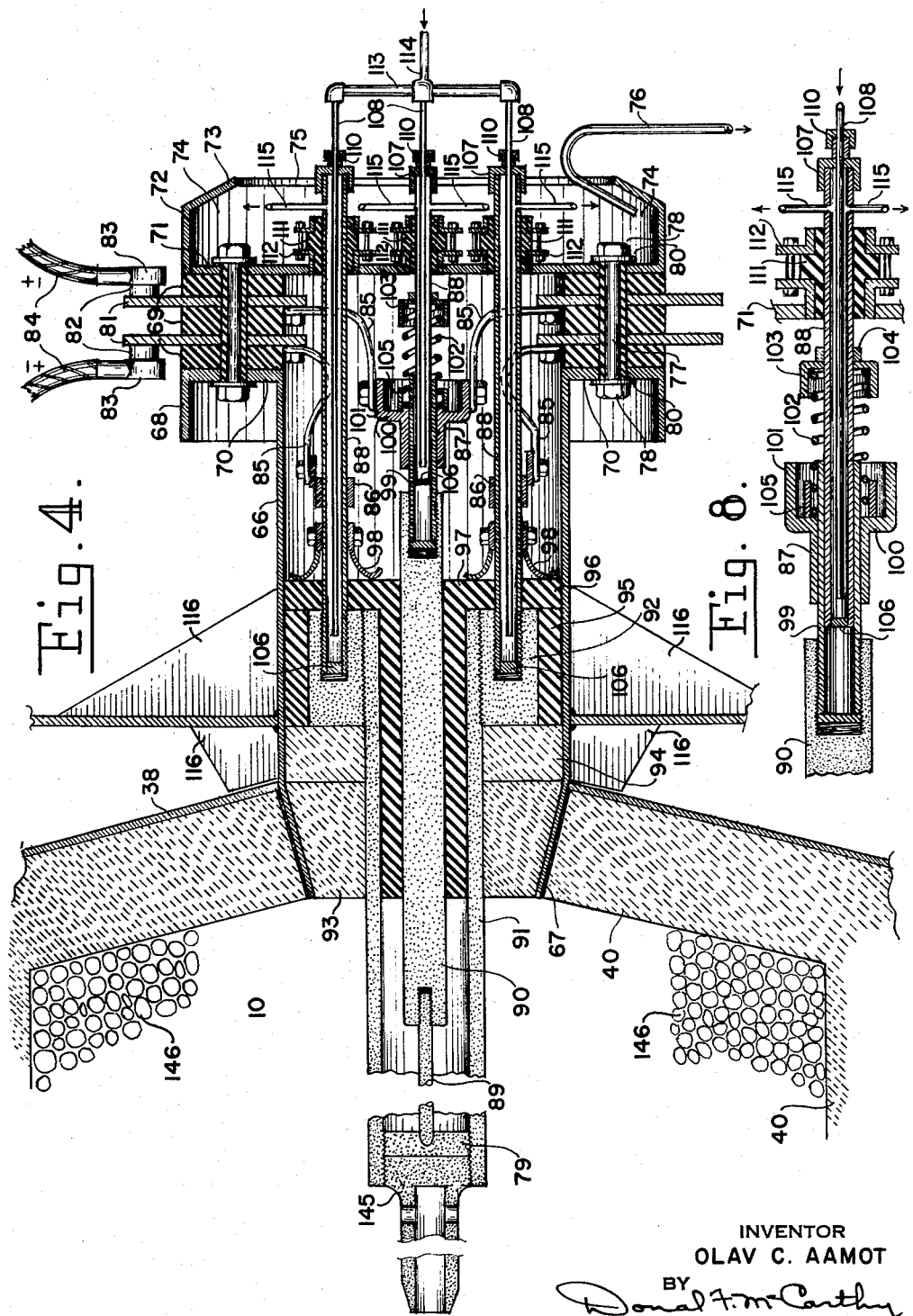
INVENTOR
OLAV C. AAMOT
BY
Donald F. McCarthy
ATTORNEY April 5, 1960     O. C. AAMOT     2,931,708
METALLURGICAL PROCESS AND APPARATUS
Filed July 2, 1954     5 Sheets-Sheet 4
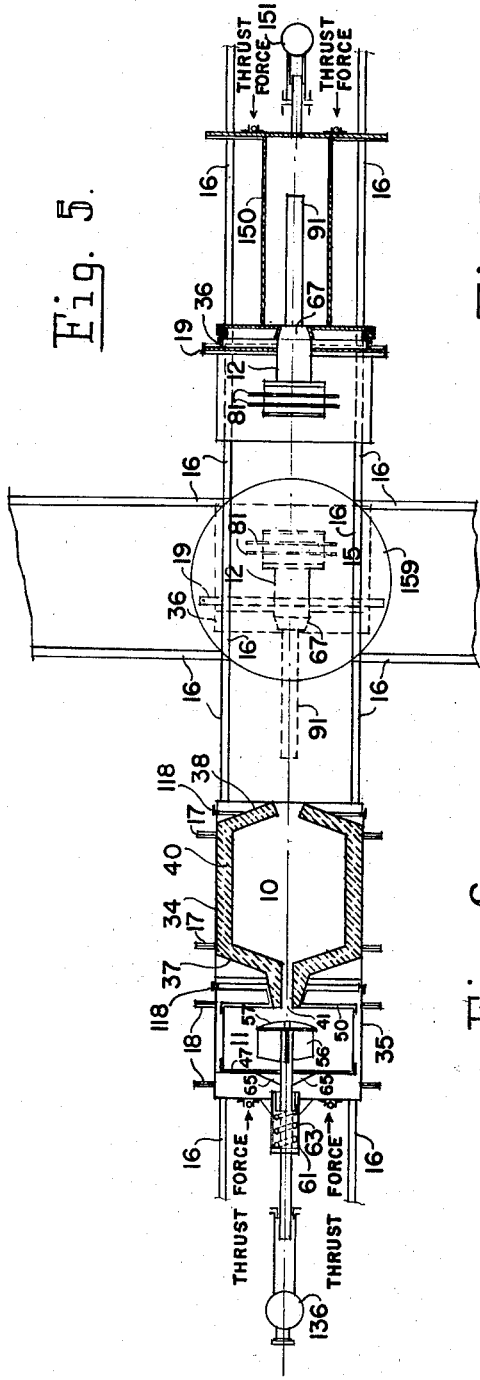
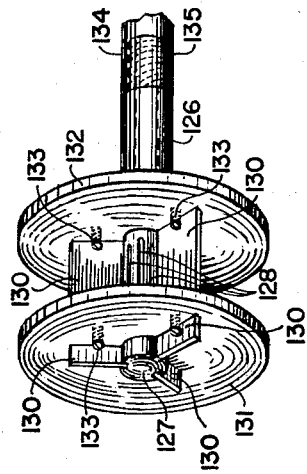
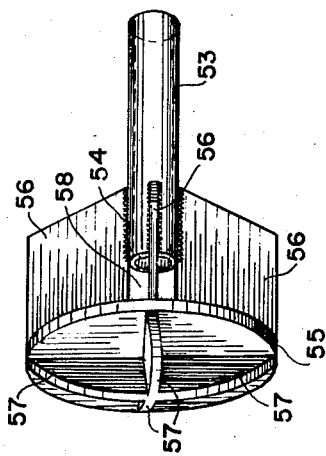
INVENTOR
OLAV C. AAMOT
BY
ATTORNEY

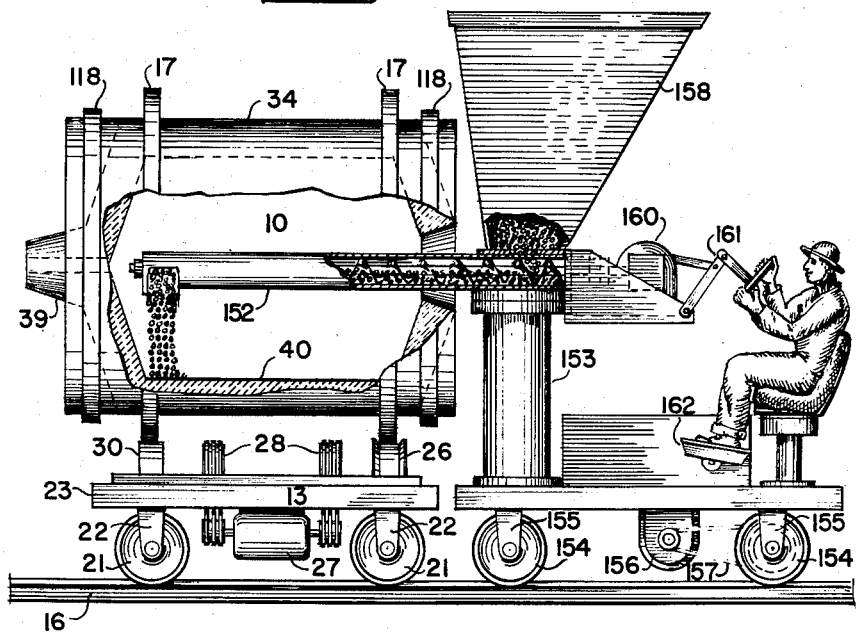
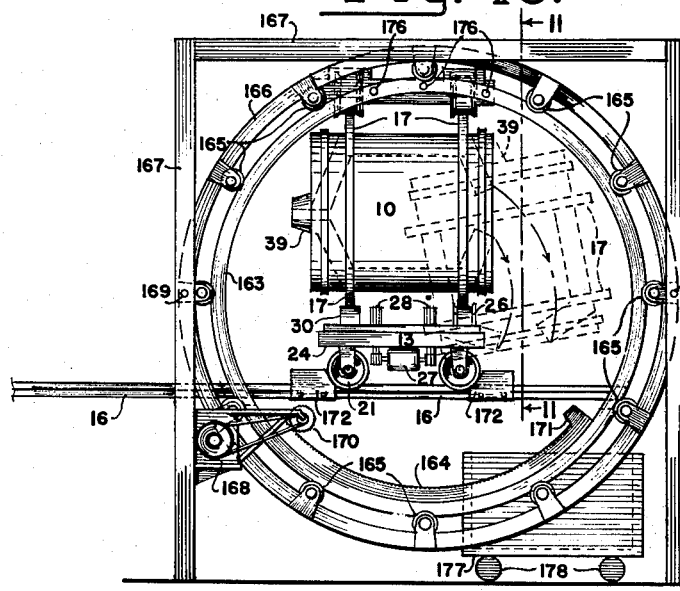
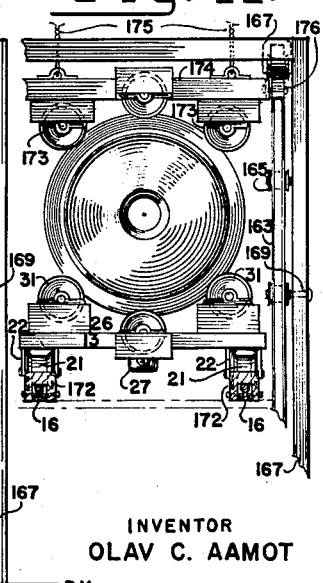
INVENTOR
OLAV C. AAMOT

United States Patent Office 2,931,708
Patented Apr. 5, 1960

2,931,708

METALLURGICAL PROCESS AND APPARATUS

Olav C. Aamot, Spokane, Wash.

Application July 2, 1954, Serial No. 440,886

12 Claims. (Cl. 23—202)

This invention relates to metallurgy and has for an object the provision of improved metallurgical processes and apparatus for use in effecting alteration of a metallurgical charge as, for example, by melting or heat-treating minerals or metals, or, by treatment at elevated temperatures of charges comprising a crude metal product and one or more other components capable of reacting to effect refining of the crude metal product and of charges comprising components capable of reacting to effect reduction of the metal of a compound with recovery of the metal in elemental form. The invention provides for reduction to elemental form of metals of various compounds under various temperature and pressure conditions which result in the production, initially, of elemental metal in vapor form, solid form or molten form. The temperature and pressure conditions employed in carrying out a process in accordance with the invention are selected on the basis of the physical properties of the refractory mineral to be melted or heat-treated, or the elemental metal to be melted or refined, on the basis of the nature of the compound of the metal to be reduced and the physical properties of the elemental metal produced by reduction, as well as on the basis of general economic considerations.

Further objects of the invention are to provide an improved method of operating a rotary reaction chamber for carrying out a high-temperature metallurgical process and an improved method for charging a rotary reaction chamber in carrying out a high-temperature metallurgical process.

A metallurgical method or process of the invention comprises heating of a charge by direct application of heat thereto while confined in a rotary reaction chamber rotating at a speed sufficiently high that centrifugal force greater than the force of gravity is exerted on all portions of the charge. A fundamental feature of a preferred method of the invention consists in heating a charge to be altered to an elevated temperature by direct application of heat thereto while the charge is confined in a rotary reaction chamber rotating at a speed sufficiently high that centrifugal force greater than the force of gravity is exerted on all portions of the charge, to maintain material of the charge in pressure contact with and in fixed position with respect to the inner peripheral surface of the reaction chamber solely by means of centrifugal force during the course of the process until the alteration of the charge sought to be accomplished, by heat-treating, melting, refining, reduction and refining, or reduction with or without melting and with or without vaporization of elemental metal produced by reduction, for example, has been accomplished. According to the preferred process of the invention, all solid material present in the rotary reaction chamber during the course of a process, whether introduced with the original charge or produced as a residue through alteration of the charge, is maintained in pressure contact with and in a fixed position with respect to the inner peripheral surface of the rotary reaction chamber both longitudinally and transversely of its axis of rotation during the entire course of the process, or from the time of its formation through alteration of the original charge material until alteration of the complete charge to the desired extent has been accomplished. The rotary reaction chamber employed in carrying out a preferred process of the invention is a chamber having a hollow cylindrical central portion provided with end walls extending inwardly (toward the axis) from the outer peripheral wall for such distances as to provide means for aiding in confining a charge within the area of the inner peripheral surface of the reaction chamber.

Friction, both internal friction between particles of materials comprising a charge and friction between the materials comprising a charge and the material of the inner peripheral surface of the reaction chamber, plays an important role in determining the form of the charge with respect to uniformity of depth or thickness. Thus, for example, even finely divided solid particles of irregular shapes have a high coefficient of friction among themselves and, also, the coefficient of friction between such particles and the materials of either smooth or rough surfaces is high. Therefore, it is possible to form and maintain within a rotary reaction chamber mounted for rotation about a horizontal axis, for example, a charge comprising solid particles substantially uniform in depth or thickness, tubular in shape and having a substantially cylindrical inner surface by rotating the reaction chamber at a speed not substantially higher than that at which centrifugal force greater than the force of gravity will be exerted on all portions of the charge. On the other hand, if a similar speed of rotation of the same reaction chamber is employed when a liquid charge has been introduced into or formed in the reaction chamber, only a part of the liquid charge or portion of the charge will become distributed over the entire inner peripheral surface, and, because of the relatively very low internal coefficient of friction existing between molecular layers of the liquid, the molecular layers will tend to move only as the result of a shearing action, and the charge may be thicker or deeper in the lowermost portion or trough of the reaction chamber than in the uppermost portion of the reaction chamber. Such a reaction chamber containing a liquid charge may, however, be rotated at a speed sufficiently high to form a substantially tubular charge of uniform depth or thickness and a cylindrical inner surface, as in the case of a charge consisting only of solid particles, if desired, but, in most instances shearing and partial flow of the molecular layers may be utilized advantageously for purposes of stirring of the charge to promote new contacts between reactants.

Any suitable method of charging solid materials to produce a charge of suitable conformation may be employed in practicing my invention. Thus, for example, I may employ a method of my invention which comprises introducing charge material into the reaction chamber at a controlled rate at which portions of the total charge are deposited within the reaction chamber successively, and simultaneously rotating the reaction chamber (1) at a speed sufficiently high that centrifugal force greater than the force of gravity is exerted on portions of the charge as they are deposited within the reaction chamber and (2) at a rate of rotation relatively to the rate of introduction of charge material such that a charge is formed within the reaction chamber by deposition of successive layers of charge material, whereby the successively deposited layers of the charge are maintained in pressure contact with one another, and the outer surface portion of the charge is maintained in pressure contact with the inner peripheral surface of the reaction chamber.

The above-described charging method may be employed with great advantage, and it is my preferred method, but satisfactory results may be obtained by employing a method of my invention which comprises placing a charge to be treated in the form of a mound in the lower portion of the interior of the reaction chamber, and rotating the reaction chamber at a progressively increasing rate of speed to develop centrifugal force greater than the force of gravity in successive portions of the charge, thereby to effect distribution of the charge over the inner peripheral surface of the reaction chamber with the formation of a charge of substantially uniform thickness, tubular in shape and maintained in a fixed position by means of centrifugal force.

In carrying out a metallurgical method of my invention, I employ apparatus of my invention comprising a rotatably mounted reaction chamber provided with charging and discharging means, means disposed within the reaction chamber for heating charge material contained therein to a temperature at which a desired alteration of the charge may be effected, means for rotating the reaction chamber at a speed sufficiently high that centrifugal force greater than the force of gravity may be exerted on a charge disposed within the reaction chamber, whereby charge material may be maintained in pressure contact with and in a fixed position with respect to the inner peripheral surface of the reaction chamber during the course of a metallurgical process.

When necessary or desirable, I provide the reaction chamber with means for sealing it against the ingress of air from the surrounding atmosphere while in operation, and I may provide the reaction chamber with an outlet for gaseous reaction products.

For heating a charge within the reaction chamber, I prefer to employ a source of heat having its zone of greatest intensity disposed in the region of the axis of rotation of the reaction chamber. Such source of heat may employ, for example, a tubular element disposed axially within the reaction chamber which is so mounted as to be capable of rotation in synchronism with the reaction chamber. Heat may be supplied to the interior of the tubular element in any suitable manner, as, for example, by combustion or by means of an electrode mounted within the tubular element and electrically connected with a source of electric current.

Complete apparatus of my invention for use in metallurgical processes of my invention, in which elemental metal in vapor form is produced, preferably includes a condenser for metal vapors communicating with an outlet for gaseous reaction products formed within the reaction chamber. The complete apparatus may include, also, a vacuum system connected with the condenser and capable of establishing and maintaining any desired pressure lower than atmospheric pressure within the reaction chamber.

In carrying out a metallurgical process of my invention in which metal vapors are produced, I prefer to employ apparatus of my invention comprising a reaction chamber mounted for rotation about a horizontal axis provided with charging and discharging means, means for heating charge material contained in the reaction chamber to a temperature at which desired alteration of the charge may be effected, including an electric resistance heating element disposed within the reaction chamber extending along a major portion of the axis of rotation of the reaction chamber and so mounted as to be capable of rotation in synchronism with the reaction chamber, means for sealing the reaction chamber against the ingress of air from the surrounding atmosphere while in operation, a condenser for metal vapors communicating with the interior of the reaction chamber so mounted in axial alignment with the reaction chamber as to be capable of rotation in synchronism with the reaction chamber and the heating means, means for rotating the reaction chamber at a speed sufficiently high that centrifugal force greater than the force of gravity may be exerted on a charge disposed within the reaction chamber, whereby charge material may be maintained in pressure contact with and in a fixed position with respect to the inner peripheral surface of the reaction chamber during the course of a metallurgical process.

Apparatus of my invention for use in carrying out a metallurgical method of my invention may be designed in accordance with the following formula:

$$F = \frac{W.V^2}{g.r}$$

(Page 1809, Chemical Engineer's Handbook, John H. Perry, published 1941 by McGraw-Hill Book Co., Inc., New York)

$F$ = centrifugal force in grams.
$W$ = weight of particle in grams.
$r$ = radius of curvature of path of particle in centimeters.

where:

$g$ = 981 centimeters per second per second; and
$V$ = Peripheral velocity in centimeters per second,
$F = (1.118W)(r)(\text{r.p.m.})^2 (10^{-5})$ and $$\text{R.p.m.} = \sqrt{\frac{(F)(10^5)}{(1.118)(W)(r)}} = \sqrt{\frac{(F)(100,000)}{(1.118)(W)(r)}}$$

For purposes of illustration, the following examples are set forth concerning rates of rotation about a horizontal axis of a reaction chamber containing a charge comprising solid particles to produce various centrifugal forces in excess of the force of gravity when solid particles are in the uppermost or arch position in a reaction chamber having an internal diameter of seven (7) feet (with respect to the inner peripheral surface of the reaction chamber lining, if any) and there is provided a layer of solid particles of charge material having a depth or thickness of one (1) foot, providing a charge-free inner cylindrical space having a diameter of five (5) feet (76.2 centimeters' radius).

EXAMPLE I $F = W$, or a particle is just exactly suspended in the uppermost or arch position in the rotary reaction chamber.

$$\text{R.p.m.} = \sqrt{\frac{100,000}{1.118 \times 76.2}} = 34.4$$

EXAMPLE II $F = 2W$, or a particle is pressed against the inner peripheral surface of the reaction chamber with a force $W$, in the uppermost or arch position in the reaction chamber.

$$\text{R.p.m.} = \sqrt{\frac{200,000}{1.118 \times 76.2}} = 48.5$$

EXAMPLE III $F = 3W$, or a particle is pressed against the inner peripheral surface of the reaction chamber with a force $2W$, in the uppermost or arch position in the reaction chamber.

$$\text{R.p.m.} = \sqrt{\frac{300,000}{1.118 \times 76.2}} = 59.5$$

EXAMPLE IV (This example is being set forth merely for the purpose of showing the geometrically progressive series relationship existing between the rates of rotation of the reaction chamber and the centrifugal force exerted.)

$F=10W$, or a particle is pressed against the inner peripheral surface of the reaction chamber with a force 9W, in the uppermost or arch position in the reaction chamber.

$$R.p.m. = \sqrt{\frac{1,000,000}{85.5}} = 108.2$$

In the situation indicated by Example IV, a particle is pressed against the inner peripheral surface of the reaction chamber by means of centrifugal force equal to nine (9) times its weight.

Compared to Example I, where a particle is just suspended in the upper position, and where centrifugal force, F, just equals the weight of particle W, we can find the necessary r.p.m. for any higher values for F, when a multiple of the force of gravity is expressed by the letter N, by multiplying r.p.m. in Example I by the square foot of N, F being equal to NW. (R.p.m. required $= 34.4 \times \sqrt{N}$.)

In other words, if $F=10W$, the necessary r.p.m. will be:

$$34.4 \cdot \sqrt{10} = 108.2 \text{ r.p.m. required}$$

For $N=20$ we find:

$$34.4 \cdot \sqrt{20} = 153.2 \text{ r.p.m. required}$$

For $N=100$ we find:

$$34.4 \cdot \sqrt{100} = 344 \text{ r.p.m. required}$$

Consideration of the above formula and examples indicates that centrifugal force will have little or no influence in a cylindrical zone having a radius of six (6) inches or less with respect to the axis of rotation of the reaction chamber when the rate of rotation of the reaction chamber is about 76.5 revolutions per minute (r.p.m.) or less.

When the rotary reaction chamber having the dimensions of that described above is rotated at a rate of about 76.5 r.p.m. or less, an axially mounted cylindrical heating element having a diameter not greater than twelve (12) inches, will not be subjected to any harmful extent to the action of centrifugal forces, and, in addition, all dust particles, whether introduced originally as part of a charge or developed during the course of a process, will be maintained in the solid charge held by means of centrifugal force in contact with the inner peripheral surface of the reaction chamber.

Apparatus of the invention designed for use in carrying out a metallurgical method of the invention comprises a reaction chamber provided at one or each end with a wall portion projecting inwardly from the inner peripheral surface of the reaction chamber a suitable distance in the direction of the axis of rotation of the reaction chamber, to form a retaining or confining wall in contact with the adjacent end surface of a charge within the reaction chamber to define the end-limit of the charge and to prevent or inhibit bodily movement of the charge longitudinally to the axis of rotation of the reaction chamber and the charge. When the reaction chamber is designed for rotation about a horizontal axis, each of the retaining or confining walls will project inwardly toward the axis of rotation a distance at least equal to the depth or thickness of the charge to be employed. When the reaction chamber is designed for rotation about an axis inclined at an angle with respect to the horizontal, the lower-most retaining or confining wall will project inwardly toward the axis of rotation a distance at least equal to the depth or thickness of the charge to be employed, and the upper-most retaining wall will project inwardly toward the axis of rotation a shorter distance somewhat in inverse proportion to the size or degree of the angle of inclination, and it may be omitted entirely when the reaction chamber is designed for rotation about a vertical axis and the angle formed with the horizontal is 90°.

The invention is adaptable for use in carrying out a wide variety of high-temperature metallurgical processes, that is, for example, metallurgical processes in which high temperatures are required to promote reactions to melt or vaporize or melt and vaporize reaction products, or to promote reactions and melt or vaporize or melt and vaporize reaction products. The following types of high temperature metallurgical processes will serve to illustrate a portion of the broad field of metallurgy to which the invention is adaptable and applicable.

Metallurgical processes involving:

I. Reduction to the elemental state of the metal of a metal oxide—

A. By means of carbonaceous reducing material, such as free carbon, or

B. By means of non-carbonaceous reducing material at atmospheric pressure and at pressures above and below atmospheric pressure.

Among processes of the type identified under I above are (1) Processes involving the reduction to the elemental state of the zinc of zinc oxide by means of free carbon, by means of elemental iron alone, or by means of free carbon and elemental iron which may be carried out at substantially atmospheric pressure (in absence of air) or at pressures below atmospheric pressure and at temperatures at which the vapor pressure of the elemental zinc produced is such that a suitable recovery of zinc may be made economically through initial production in the molten state or in the vapor state.

(2) Processes involving reducion to the elemental state of magnesium of magnesium oxide (from whatever source obtained, including calcined natural magnesite, calcined dolomite and calcined magnesium hydroxide obtained from sea water), carried out at high temperatures and very low pressures, in which non-carbonaceous reducing material such as silicon or a silicon-containing alloy such as ferrosilicon is employed and in which the elemental magnesium produced is vaporized, and the vaporized magnesium is collected in a condenser preferably in a solid state.

(3) Processes involving reduction to the elemental state of calcium of calcium oxide, carried out at high temperatures and very low pressures, in which silicon, or aluminum, or a silicon-bearing alloy, or an aluminum-bearing alloy is employed as reducing material and in which the elemental calcium produced is vaporized, and the vaporized calcium is collected, initially, in a condenser in either the liquid state or the solid state.

(4) Processes involving reduction to the elemental state of metals of the oxides of metals of the group consisting of chromium, manganese, nickel, titanium, molybdenum, tungsten, vanadium, zirconium and hafnium carried out at high temperatures and suitable pressures, in which free carbon or a non-carbonaceous element, such as silicon, magnesium, calcium and aluminum, is employed as reducing material and in which elemental metal produced by reduction is obtained in a substantially pure form in the solid or liquid state free of other reaction products or in a substantially pure form as a separable component of a mixture comprising, also, an oxide of the non-carbonaceous reducing agent employed.

(5) Processes involving reduction to the elemental state of iron contained in iron oxide by means of intimately mixed solid carbonaceous reducing material, at a relatively low temperature above about 550° C. (in absence of air) and at atmospheric pressure or at any suitable pressure above or below atmospheric pressure, with the production of a substantially solid or a plastic sponge iron product, or as individual iron particles by using an excess of carbonaceous reducing material.

II. Reduction to the elemental state of the metal of a metal carbide—

A. By means of an oxide of a metal, which metal is volatile at the temperature and pressure employed;

B. By means of an oxide of any metal that is non-volatile at the temperature and pressure employed and the oxide of which is capable of reacting with the carbide to effect reduction to the elemental state of both the metal of the oxide and the metal of the carbide;

C. By means of an oxide of the metal of the carbide to effect reduction to the elemental state of the metal of the oxide and the metal of the carbide; or D. By means of an oxide of a ferro-alloy metal of the carbide, which oxide is capable of reacting with the carbide to effect reduction to the elemental state of both the metal of the carbide and the metal of the oxide.

Among processes of the type identified under II are:

(1) Processes in which the metals of the carbides to be reduced are ferro-alloy metals of the group consisting of chromium, manganese, nickel, titanium, molybdenum, tungsten, vanadium, zirconium and hafnium;

(2) Processes in which carbides of the metals to be reduced are subjected to the action of oxides of relatively low-boiling point metals, such as zinc and magnesium, at high temperatures and very low pressures at which carbon and oxygen are eliminated as carbon monoxide, with reduction to the elemental state of the metal of the carbide, and withdrawn from the reaction vessel, zinc or magnesium is reduced to the elemental state and vaporized and withdrawn in the vapor form from the reaction vessel, the zinc or magnesium vapor is condensed, and the ferro-alloy metal of the carbide in the elemental state and substantially free of carbon is retained in the reaction vessel, in non-liquid or solid form or in liquid form, from where it subsequently is withdrawn or discharged.

(3) Processes in which metal carbides are subjected to the action of oxides of the same metals or of different metals at high temperatures and very low pressures at which carbon of the carbides and oxygen of the oxides combine to produce gaseous carbon monoxide, which is withdrawn from the reaction vessel, with the production in elemental form of the metal or metals of the metal carbide and metal oxide compounds, which elemental metal is retained in the reaction vessel, in non-liquid or solid form or in liquid form, from where it subsequently is withdrawn or discharged.

III. Reduction to the elemental state of the metal of a metal sulphide—

A. By reaction of a metal sulphide with an oxide of a metal different than the metal of the sulphide;

B. By reaction of a metal sulphide with an oxide of the same metal;

C. By reaction of a metal sulphide with a metal different than the metal of the sulphide and capable of reducing to the elemental state the metal of the sulphide with the production of a sulphide of the different metal.

Among processes of the type identified in III above are:

(1) Processes in which a sulphide of a metal other than iron, such as, for example, zinc sulphide, is subjected to the action of iron oxide at a high temperature and low pressure at which the oxide and sulphide react to effect reduction to the elemental state, or to a lower oxide stage of the iron and to the elemental stage of the metal other than iron with the production of a major part of the sulphur as substantially pure sulphur dioxide, which is withdrawn from the reaction vessel and collected, and with the vaporization of the elemental zinc which is collected and condensed. The process may involve the use of oxides and sulphides of different metals that are volatile at different temperatures capable of being attained in the process, in which event, both metals may be withdrawn, in vapor form, from the reaction vessel and subjected to a single condensation step to produce an alloy or to several condensation steps to form products consisting essentially of a single metal.

(2) Processes in which a metal sulphide is subjected to the action of an oxide of the same metal, at an elevated temperature and at a suitable pressure to effect a reaction between the metal oxide and the metal sulphide with reduction to the elemental state of the metal of the sulphide and the oxide and the production of substantially pure sulphur dioxide, which is withdrawn from the reaction vessel and collected, and with the production of elemental metal in the molten, gaseous, solid or plastic state. Such processes are exemplified by the following reaction equations:

(a) $$Cu_2S + 2CuO = 4Cu + SO_2$$
(b) $$PbS + 2PbO = 3Pb + SO_2$$

The lead sulphide-lead oxide reaction can be carried out advantageously to produce, collect and condense elemental lead of high purity by carrying out the reducing reaction at a temperature above 1100° C. and a pressure below that equivalent to 100 microns of mercury.

(3) Processes in which zinc sulphide is subjected to the action of metallic iron at a high temperature and at a pressure below atmospheric pressure (below 1000 microns of mercury, for example) at which the zinc sulphide and the metallic iron react to produce iron sulphide and elemental zinc in vapor form, and the vapor is withdrawn from the reaction vessel and collected and condensed. Liquid iron iron-sulphide remains in the reaction vessel from which it may be withdrawn or discharged as required.

IV. Processes for refining metal products through removal of contaminants, which, in themselves, may be valuable—

A. By means of heat treatment of molten metal resulting in vaporization and removal of one or more contaminants contained in the molten metal;

B. By means of heat treatments of molten metal coupled with agitation of the molten metal in the presence of and in contact with scavengers in the form of compounds, elements or alloys capable of forming, selectively, with a contaminant sought to be removed, a separable product containing the scavenger and the contaminant.

C. By means of fractional distillation and separate recovery of one or more metals from a molten alloy containing two or more metals;

D. By means of heat treatment of a solid product containing one or more high-boiling point metals and one or more relatively low-boiling point metals through regulation of heat applied to establish and maintain a temperature at which the one or more high-boiling point metals will remain in the solid or non-volatile state and the one or more metals will be vaporized; and E. By means of liquidation through heating a solid product containing one or more high-melting point metals and one or more low-melting point metals to a temperature at which the one or more low-melting point metals melt while the one or more high-melting point metals remain in the solid state and the molten metal is drained away from the solid metal.

Processes included in IV above may be illustrated as follows:

(1) Processes involving the separation of zinc by vaporization—

(a) From scrap brass; and (b) From silver associated with zinc in alloys obtained in the Parkes process for refining lead with the recovery of its silver content.

Such processes may be carried out under atmospheric pressure or under pressures lower than atmospheric pressure at suitable temperatures. The vaporized zinc is collected and condensed, and its associated metal (lead or silver) remains in the reaction vessel, from where it may be removed or discharged for use.

(2) Processes involving—

(a) The separation of metallic manganese from high-carbon ferromanganese;

(b) The separation of metallic sodium from metallic magnesium; and (c) The separation of metallic magnesium from metallic calcium.

The processes identified by the letters (a), (b) and (c) immediately above may be carried out by heating the alloys comprising ferromanganese, sodium and magnesium, and calcium and magnesium at temperatures above their melting points while maintained at appropriate pressures lower than atmospheric pressure to effect vaporization of the metals, manganese, sodium and magnesium, respectively, and collecting and condensing the vaporized metals.

(4) Chloridizing processes in which a compound of a metal to be chloridized is subjected to the action of a chloride of another metal at a suitable temperature and under a suitable pressure. Such processes are illustrated by a process in which iron oxide is subjected to the action of molten calcium chloride, at atmosphere pressure or at a pressure below atmospheric pressure, with the production of non-volatile calcium oxide and volatile iron chloride (ferrous chloride or ferric chloride or both). The iron chloride is vaporized and collected and condensed for use.

V. Processes that consist essentially of melting—

A. Refractory metals or alloys such as low-carbon ferrochromium and

B. Relatively low-melting point metals such as calcium and magnesium at temperatures such that there is achieved a degree of fluidity sufficient to facilitate their immediate use in further industrial processes or procedures wherein they may function, for example, as alloying agents or reducing agents.

As hereinbefore pointed out, the invention provides apparatus and methods for use in high-temperature metallurgical operations such, for example, as those involving recovery or extraction of metals from metal-bearing ores and other materials, refining of metals and melting of metals at atmospheric pressure and at pressures above and below atmospheric pressure. Furthermore, the invention embraces operations in which charges employed may consist entirely of solids, entirely of liquid, or partly of liquid and partly of solids, and the metals may be recovered initially entirely in the solid state, entirely in the liquid state, or partly in the liquid state and partly in the solid state. The solid components of a charge employed in accordance with the invention may be relatively coarsely divided or relatively finely divided and the components may be employed in loose form or in agglomerated form.

The invention is highly suitable for use in the extraction or recovery of metals under vacuum or low-pressure conditions, and, for the purposes of illustration, the art of winning or recovering magnesium by so-called silicothermic or electrothermic reduction under vacuum will be considered and discussed in some detail.

According to some heretofore customary procedures, agglomerates or briquets consisting of finely divided calcined dolomite intimately mixed with finely divided ferrosilicon, usually containing about 78% silicon, are heated under vacuum conditions at a pressure below 300 microns mercury (Hg) to a temperature of about 1180° centigrade in an apparatus to which a condenser is attached for collecting magnesium vapor and in which the magnesium vapor is condensed to the solid state through cooling to temperatures below the melting point of magnesium to prevent the passing of any appreciable amount of magnesium through the vacuum system and to the vacuum pumps.

One of the types of retort systems now commercially used for such operations employs a horizontal thick-walled, alloy steel tubular retort, closed at one end and having at its other end a condenser communicating with its interior and with a conduit leading to a vacuum pumping system. The retort is externally heated, and an operating temperature below by close to 1200° centigrade is provided for, this being about the maximum temperature that the heavy alloy steel tube will withstand with vacuum on the inside without collapsing. Usually, the walls of the tubular retort are about one inch thick, the internal diameter is about 10 inches, and the heated section is about 9 feet in length, providing for an effective charge capacity of about three and one-half (3½) cubic feet, corresponding to a charge weight of roughly 250 pounds from which about 35 pounds of magnesium metal is extracted for each run extending over a cycle of about 9 hours. It will be seen that each retort is capable of producing about 93 pounds of magnesium per operating day.

Another retort system employed heretofore comprises a large vertical retort in the form of a vertical outer cylinder of steel provided with an annular lining of heat refractory and heat insulating material forming a supporting structure for electric heating elements. The lining and heating elements define the wall of a cylindrical space in which are mounted two steel cylinders in spaced relationship which define an annular space for the reception of charge material, leaving a centrally disposed cylindrical space. The innermost steel cylinder is perforated to provide passages for the flow of magnesium vapor from the charge to the centrally disposed space from where the magnesium vapor flows to a condenser disposed below the retort proper and removably attached thereto in gas-tight relationship by means, including a rubber seal. This apparatus is described in U.S. 2,386,189 to G. D. Bagley. It has operated successfully to produce a maximum of 1250 pounds of magnesium per cycle of 4 days, or about 310 pounds magnesium per operating day.

Operation of this retort, also, is limited to the use of a temperature lower than but near 1200° C. because of the strain on the heating elements and on the containers suspending or supporting the charge, which may weigh about 8000 pounds and have a volume of about 100 cubic feet.

Neither of the prior two systems referred to is capable of being employed in the treatment of a liquid charge either because the liquid charge cannot remain in place, or because it will corrode the retort or container metal walls.

In addition, there is described in the literature a type of apparatus comprising a reaction chamber in the form of a horizontal cylinder to which a condenser is attached. The assembly is mounted on rollers, so that the whole may be rotated slowly about a horizontal axis. Apparatus of this type is described in U.S. Patent 2,159,910 to H. Seliger et al. This retort comprises a heating element centrally disposed in the reaction chamber. An eccentric charging and discharging attachment is located on the wall of the reaction chamber, forming a lock chamber to provide a tight seal. According to the description this apparatus contained in the aforementioned patent is capable of producing 250 kilograms or more of magnesium per day, or about 550 pounds or more per day per furnace or retort or reaction chamber.

United States Patent No. 2,143,197 describes apparatus comprising a retort or reaction chamber mounted for rocking movement about a horizontal axis and provided with heating elements attached to the uppermost or arch portion of the inner refractory wall.

All the prior art apparatus comprising retorts or reaction chambers comprise means for condensing magnesium vapor to obtain a solid product. The apparatus of the Seliger patent includes, also, means for melting the solid magnesium to permit discharging of the magnesium from the condenser in liquid form.

In operating the two types of apparatus comprising revolving or rocking retorts or reaction chambers referred to above, the charge, in each case, will occupy the lower part of the retort or reaction chamber furnace space and will be tumbled about while rotating or rocking so as to provide for the establishment of uniform temperatures during the reaction. Under these conditions, it is unavoidable that some abrasion of the charge will take place and some dust will be formed and subsequently deposited in the condenser along with the metal. This objection also exists with respect to the large vertical apparatus of the Bagley patent.

Another general objection with respect to methods and apparatus of the two first mentioned retort systems is that, since the operating temperature is limited because of structure features, the heat input and temperatures available for promoting reactions are limited, and, consequently, reactions are relatively slow and recoveries are low. Furthermore, heat efficiency is relatively low because considerable dead weight in the form of refractory walls must be heated in each system, as compared to the revolving or rocking retort or reaction chamber systems. A further objection, particularly against the two first mentioned types, is that for high-vacuum operations it is essential that there be free access to the entire charge of the vacuum effect applied, with a maximum so-called "mean free path" available to facilitate removal of metal vapors generated or produced.

All of these objections are overcome and many advantages are obtained in operations utilizing the method and apparatus of the present invention. The invention provides for a more efficient utilization of the costly space under vacuum, and it deals effectively with the dust problem as well. Apparatus can be designed and operated to accomplish a substantially greater production per day per unit of practical size and reasonable outer dimensions in accordance with the present invention, as compared with the design and operation of the apparatus of the prior art.

Apparatus of the present invention preferably comprises a horizontally disposed and symmetrically designed cylindrical furnace or reaction chamber, suitably lined, with condenser and heating element units removably connectable therewith, all mounted for rotation about a common horizontal axis. Each individual unit is supported for rotation on wheels or roller bearings and equipped with driving means so that it can rotate about its horizontal axis at a speed sufficiently high that the charge in the reaction chamber is held or maintained in pressure contact with the lining of the reaction chamber by means of centrifugal forces well in excess of the force or pull of gravity on the charge particles, when they are considered in the upper or arch position of the reaction chamber as it rotates. All solid charge particles, including so-called dust, therefore, will remain in place on the inner wall of the reaction chamber, and those particles that are spaced inwardly from the inner peripheral surface of the reaction chamber by means of other particles will move outwardly toward the inner peripheral surface as the charge shrinks unavoidably as reactions proceed during the course of the process. All three units of the apparatus, namely, the reaction chamber, the condenser and heating element, are supported on individual trucks or carriages on a rail system, and provided with individual driving motors, capable of maintaining the same synchronous speed when the units are assembled for operation or otherwise.

The heating element is inserted in the reaction chamber only after the charge is deposited symmetrically and uniformly on the rotating inner peripheral or cylindrical wall of the reaction chamber. The heating element itself, for proper operation, must be brought up to a speed synchronous with that of the reaction chamber before being inserted in place, and, thereafter, it is vacuum sealed by means of an annular rubber seal.

The removable condenser section, which is disposed adjacent the end of the reaction chamber opposite the end adjacent the heating element, also is mounted for rotation at the same synchronous speed as that of the reaction chamber. The condenser comprises a cylinder in which a deflector shield is mounted centrally and which communicates with an exhaust line or conduit leading to a vacuum system. Vacuum is applied to the whole assembly through the end opposite the end at which heating element is disposed through the agency of a centrally disposed and rotatable exhaust tube or conduit, which again connects with a stationary vacuum header line through a packed, oil sealed and lubricated joint.

After the reaction chamber unit, the heating element unit and the condenser unit have been assembled in operating relationship with one another and with the vacuum system and tightly sealed against ingress of air from the surrounding atmosphere, heat is applied by means of the heating element unit, and the innermost surface portion of the charge is brought up to reaction temperature with very little delay. The heat, thereafter, will gradually dissipate from the inner surface portion outwardly through the charge, largely by conductivity. Heat transfer is materially aided by the outwards pressure exerted by the innermost, and hottest, layer of charge under the influence of centrifugal force.

The total peripheral surface of the innermost or surface layer of charge material functions as the absorbent of heat radiated from the heating element, and the portion of the charge immediately in contact with the inner peripheral surface of the reaction chamber is the final or last portion of the charge to become heated to reaction temperature through gradual passage of heat through the charge body. There is no intervening wall between the heating element and the charge so that access to the charge by the vacuum effect applied is at maximum since there is no physical contact between the heating element and the charge. Dust, being in frictional contact with charge or lining is subject to the influence of centrifugal forces and, therefore, cannot possibly escape into the condenser. Metal vapors and other gaseous reaction products emanating from the charge, because of their low molecular friction will be subjected to the influence of centrifugal force to only a very slight extent, if any, and they will create a higher pressure in the free space within the reaction chamber, proportional to their partial pressures over the charge body at the temperature prevailing there, and they will be drawn over into the condenser section because of the lower absolute pressure existing in this space. Here, they will meet the rotating deflector shield which is equipped with cross blades giving the gases and metal vapors a swirling motion outwardly toward the cold peripheral wall of the condenser, which is very extensive in area, and the metal vapors will be effectively condensed on this peripheral wall in the form of a smooth and dense deposit. The heat content of the metal vapors and gases above the ambient temperature of the condensing metal, which should be but slightly below the melting point of magnesium in this case, is taken up by cooling means such as a water spray applied to the outer cylindrical surface of the rotating condenser. The non-condensable gases left over, if any, will be drawn over into the exhaust line, but will have to pass another swirling impulse before doing so, namely vanes which support the deflector shield to the exhaust line. This feature protects against withdrawing or sucking magnesium vapor into the vacuum lines. Any amount of vapors of alkali metals present at this point and not condensable at the relatively high temperature of condensation of magnesium will follow the non-condensable gases and may be caught in a trap in the vacuum header at comparatively lower temperatures.

This invention differs materially from the previously known rotating furnaces or reaction chambers in several ways.

First of all, none of the previously mentioned rotating furnaces or reaction chambers was designed for a high speed of rotation such as is necessary to maintain the charge in pressure contact with the inner peripheral surface of the reaction chamber by means of centrifugal force well in excess of the force of gravity. In order to provide for development and utilization of such a high speed (for example, a speed of 75 r.p.m.) in connection with a reaction chamber having an inner cylindrical space 5 feet in diameter, the furnace, with its charge contents, should be dynamically balanced, and no such eccentricity as the charge and discharge arrangement shown on the Seliger furnace is tolerable. Furthermore, the charge itself cannot be only slid into the furnace, it must be disposed in uniform layers with considerable accuracy by employing, for example, a horizontal screw conveyor, feeding charge evenly to the down-going side of the lining, and moving regularly forth and back until all of the charge has been placed against the lining while the furnace is rotating at a speed sufficiently high for centrifugal force to take effect and hold the charge particles against the lining.

Secondly, the fact that the charge is spaced uniformly against the cylindrical lining permits the introduction of much more charge into the furnace. If we consider the case of a reaction chamber having a cylindrical inner surface, when lined, 7 feet in diameter and the provision of a charge tubular in form and having a uniform thickness of 12 inches, there will be created a free and clear space in the interior 5 feet in diameter, and, yet, we have utilized about 49 percent of the cross sectional area of the cylinder formed by the inner surface of the lining. If the reaction chamber were stationary, such a charge would fill practically half of its inner cylindrical space, virtually the entire space below the horizontal axis. If we consider providing in the same reaction chamber a charge having a uniform thickness of 18 inches, free inner space will be 4 feet in diameter, and we shall have utilized about 67.5 percent roughly ⅔ of the total volume of the available cylindrical space and, yet, this is a perfectly feasible procedure. The cubic charge capacity for a 7 feet long cylinder of 7 feet inner diameter to the lining will vary with the thickness of the charge bed as follows:

| Inner free space diameter, feet | Charge bed thickness, inches | Percent of cylinder space utilized | Charge capacity in cubic feet |
| --- | --- | --- | --- |
| 5 | 12 | 49 | 131.6 |
| 4 | 18 | 67.4 | 181.0 |
| 3 | 24 | 79.5 | 210.0 |
| 2 | 30 | 90.0 | 315.0 |

Since the production of magnesium per cubic foot of charge comprising calcined dolomite and ferrosilicon in proportions considered by those skilled in the art to be most effective and desirable is 12 pounds, the total magnesium production for each of several charges of different volumes (and proportionate weights) may be represented as follows:

| Charge (in cubic feet) | Magnesium Produced (in pounds) |
| --- | --- |
| 131.6 | 1,580 |
| 181.0 | 2,170 |
| 210.0 | 2,520 |
| 315.0 | 3,780 |

The residue after the magnesium extraction will shrink to about one-half the original volume, and, as the hottest layer is gradually forced outwardly during this shrinkage the centrifugal force acting on the hottest layer will increase more and more, thereby speeding up the reaction by increasing the heat transfer outwardly, until near the end of the operation when more and more cooling is required on the outer wall of the cylinder body as the heat penetrates outwardly.

The condenser section for an assembly comprising a reaction chamber having an internal length of 7 feet and an internal diameter of 7 feet may have an internal diameter of 8 feet and an effective internal length of 4 feet. Such a condenser will have the following capacity for condensation of magnesium vapor with the production of a smooth, magnesium deposit of uniform thickness on its inner peripheral surface:

| Thickness of Deposit in Inches | Cubic Feet of Metal Condensed | Free Inner Space Diameter in Feet | Weight of Condensed Metal in Pounds |
| --- | --- | --- | --- |
| 6 | 46.8 | 7 | 5,170 |
| 12 | 90.4 | 6 | 10,000 |
| 18 | 122.0 | 5 | 13,400 |
| 24 | 150.8 | 4 | 16,600 |

It will be noted that, even with the maximum possible charge in the reaction chamber, it will still require about four and four-tenths (4.4) runs to produce enough magnesium to fill the condenser to its maximum capacity. This feature has the advantage of making unnecessary emptying or discharging of the condenser between runs. The condenser, depending upon its capacity and the capacity for production of magnesium of a reaction chamber with which it is associated, may receive and condense the magnesium vapor produced in treating several or, even, a larger number of charges.

Another point of difference between the apparatus and method of the invention herein disclosed and the apparatus and methods of the prior art resides in the fact that there is much less restriction on the temperature at which the reaction may be conducted, in accordance with the invention, because the heating element may be made of a carbon or graphite structure, capable of developing a temperature within itself of about 2000° C. and developing a temperature of 1600° C. on the innermost layer of charge material within the reaction chamber. The innermost layer of charge material may be permitted to liquefy in which case the resulting greatly condensed liquid residue will move outwardly toward the inner peripheral surface of the reaction chamber. The reaction pressure of magnesium will be greatly increased at such higher temperatures, which will help to maintain porosity of the charge during the reaction.

The calculated increases in reaction pressures of magnesium with increases in temperature are about as follows:

T=1067° C. Mg pressure=5 mm. Hg
T=1157° C. Mg pressure=20 mm. Hg
T=1267° C. Mg pressure=74.5 mm. Hg
T=1397° C. Mg pressure=253 mm. Hg A temperature differential or gradient will be established and exist between the very high temperature innermost layer of charge and the relatively low-temperature layer of charge in contact with the inner peripheral surface of the reaction chamber because of the differences in distances of two layers from the source of radiating heat of the central heating element, which feature acts as an automatic brake in a thermal sense, so that the outermost layer of reacting charge may in this case safely remain in the solid phase, enabling the removal of semi-fused and fused residue or slag from the inner layers resting upon a non-fused outer layer.

The data concerning temperatures and magnesium vapor pressures show clearly how important it is to be able to exert a higher average temperature on the reacting layers of charge, whether the charge be in the form of loose powder or in the form of agglomerated or briquetted powdered or finely divided particles.

Upon opening up the reaction chamber after a short period of sharp cooling of the outside of the outer wall surface of the reaction chamber, with the heating power off the vacuum is released, and the heating element may be withdrawn and put into a protective cooling device under vacuum. The reaction chamber and the condenser may then be further cooled while rotating, with the discharge end of the reaction chamber open, until sufficiently cool for handling of the charge residue, at which time the reaction chamber may be disengaged from the condenser by a horizontal pull on the truck unit supporting it. Thereafter, the reaction chamber may be moved to a suitable point for discharge of the inner peripheral charge residue, and its speed of rotation may be reduced to a speed at which the residue will fall away from the lining. This speed of rotation may be similar to that of the ordinary ball mill used for grinding purposes in order to accomplish breaking of the residue into particles and lumps suitably small for discharging.

The removal of residue in this case is further facilitated by the well known fact that dicalcium silicate is converted to powder upon cooling under atmospheric pressure.

Discharging may be facilitated greatly by the use of a tilting stand, wherein the reaction chamber may be slowly tilted to pour out the contents while slow rotation of the reaction chamber is being continued.

The solid metallic magnesium, after removal from the condenser, may be sawed to produce blocks of suitable sizes for remelting, or of suitable sizes for direct sale of the purest possible metal product of the process.

The reduction of magnesium may be carried out in accordance with the invention at average temperatures of about 1400° C., and with an applied vacuum of the order of 100 microns of mercury for fast and efficient operation.

While, for the above-described operation of recovery of magnesium from calcined dolomite by ferrosilicon, it is desirable to grind the components reasonably fine and to compress the mixture into briquets in order to promote the reaction, fine grinding, intimate mixing and compressing are not essential for carrying out other types of processes in accordance with the invention, one of which, namely the recovery of zinc from calcined zinc blende by means of iron will be described hereinafter. The prior art, for example, the United States Patent No. 1,751,778 to Von Girsewald et al., describes this type of reaction carried out under vacuum conditions and at moderate temperatures, preferably below 1000° centigrade, at which moderate temperature a zinc deposit free of lead may be obtained in the condenser. It is stated in the specification of the patent that finely divided iron or other metals are used in admixture with the normally small-size calcined zinc blende or other zinc oxide-bearing material.

Reaction between zinc oxide and metallic iron may be carried out with great advantage in accordance with the present invention, because it is only necessary to mix an excess of iron in the form of reasonably small particles or pieces of cheap scrap iron, such as shredded steel turnings or cast iron borings, with roasted zinc blende and charge the mixture layer by layer to the rotating reaction chamber, finishing the charging operation with an excess of iron on the innermost surface. This excess of iron will be forced outwardy by centrifugal force toward the inner peripheral surface of the reaction chamber and it will react effectively and completely with any free zinc oxide during the course of its outward movement.

Usually, because of the presence of a small amount of unroasted zinc-iron sulfide, the residue will have a tendency to become liquid, and this tendency has created serious obstacles in the use of retort systems employed heretofore. In the rotating reaction chamber employed in practicing the present invention, this liquid residue will eventually pass outwardly under the influence of centrifugal forces toward and into contact with the inner peripheral surface of the reaction chamber, and it will tend to occupy and remain in position in the outermost layer of the charge within the reaction chamber, because, as a liquid of low melting point, it is mobile and is of a higher apparent specific weight than zinc oxide. When more and more liquid residue is formed during the reaction, so that the voids between the solid particles are taken up, a condition will be reached where excess liquid residue forms a pool in the lowermost portion of the reaction chamber, through which liquid is continually passed the still unreacted portion of the solid charge, held in pressure contact with the inner peripheral wall of the reaction chamber with development of a violent stirring effect. Since the reaction mixture in all cases is so proportioned that there will be an excess of solid iron over zinc oxide and zinc sulphide, it will be clear that excellent reaction conditions will be maintained until substantially all zinc of the zinc oxide has been reduced. Usually, the recovery of zinc is 99 percent or better.

In operations designed for the recovery of zinc, it is feasible and desirable to employ temperatures lower than those employed in the silicothermic or electrothermic distillation of magnesium, in order to minimize the escape into the condenser of volatile iron sulphide. Sulphides of zinc and lead, though volatile at the temperatures employed, will not pass out of the reaction chamber, for they will react with the excess iron present in the charge and as the innermost charge layer to produce zinc and lead vapors, respectively. Temperatures in the range of between 1100 and 1300° centigrade are generally preferred, and pressures of 1000 microns of mercury or below will be sufficient degree of vacuum to use.

The liquid residue may be discharged from the reaction chamber by simple pouring after completion of the reducing operation. The liquid residue consists essentially of a mixture of iron oxide, iron sulfide, silica and metallic iron, and it usually has a melting temperature of about 950° C. when containing 5–10% sulphur, or more, ordinary amounts of impurities such as silica, and zinc in amount equal to about 0.2 percent by weight.

During the course of the operation, the charge shrinks in volume, leaving a residue having a volume equal to about 10 to 20 percent of the volume of the original charge. The excess of iron need not be more than 20 to 30 percent of the iron required theoretically according to the demands of the reactions indicated by the following equations:

$$4ZnO + 3Fe = 4Zn + Fe_3O_4$$
$$ZnS + Fe = Zn + FeS$$
$$FeS_2 + Fe = 2FeS$$

It is technically and economically feasible to employ the principles of the zinc sulphide-metallic iron reducing operation for the treatment of finely divided flotation concentrates containing one or more sulphides of zinc, lead, copper and iron. In carrying out such operations, it is feasible to employ a cheap form of iron such as shredded steel turnings, cast iron borings and the like, virgin or secondary copper in the form of turnings, or brassy residues, in promoting reactions illustrated by the following equations:

*Using iron as reactant*

$$PbS+Fe=Pb+FeS$$
$$ZnS+Fe=Zn+FeS$$
$$Ag_2S+Fe=2Ag+FeS$$
$$CdS+Fe=Cd+FeS$$
$$2CuS+Fe=Cu_2S+FeS$$
$$FeS_2+Fe=2FeS$$

Utilizing such a reaction in the rotating reaction chamber in the treatment of either a lead concentrate or a zinc concentrate with an excess of iron as the innermost layer, we can extract and collect in the condenser in metallic form the zinc and lead and most of any silver that may be present in the concentrates. The liquid residue will contain ferrous sulphide (FeS), cuprous sulphide ($Cu_2S$), any gold (Au) that may be present in the concentrates, and the excess metallic iron employed in forming the charge, and it will be fluid at about 950–1000° C. This residue can be discharged and sold for its net value, or it can be roasted to produce sulphur dioxide ($SO_2$) and iron oxide, particularly if the content of copper and gold is negligible. In the treatment of flotation concentrates of zinc sulphide ores containing relatively large amounts of copper and gold it may be more desirable to use metallic copper or brass instead of metallic iron as the reaction. Reactions of the type indicated by the following equations will take place when copper or brass is used as reactant:

$$ZnS+2Cu=Zn+Cu_2S$$
$$Ag_2S+2Cu=2Ag+Cu_2S$$
$$PbS+2Cu=Pb+Cu_2S$$
$$CdS+2Cu=Cd+Cu_2S$$

By using, in certain of these cases, as many as three condensers, in series, and maintained at different temperatures, it is possible to make a separation in the first condenser of lead (Pb) with some ferrous sulphide (FeS) and practically all silver present, and in the second condenser zinc with lead below one (1.0) percent and substantially free of sulphur, and in the third condenser a cadmium zinc condensate suitable for redistillation to recover cadmium and zinc separately.

By the same method, employing moderately high temperatures under vacuum conditions, copper flotation concentrate containing some zinc may be freed of zinc, by using copper or brass scrap in suitable sizes as the reactant. The only volatile constituents will be metallic zinc and smaller amounts of cadmium or lead or silver if present, and all of the copper will be recovered in the residue as cuprous sulphide ($Cu_2S$).

Where liquid sulphur dioxide is valuable and where a zinc sulphide concentrate is available, the zinc sulphide may be reacted with an oxide of iron such as magnetite or hematite, or roasted iron sulphides, to produce directly: metallic zinc, sulphur dioxide ($SO_2$) and a liquid iron oxide-iron sulphide residue similar to the residue obtained from the zinc oxide-zinc sulphide-metallic iron reaction described above.

The zinc may be collected in the solid state or the liquid state, and the sulphur dioxide may be collected and compressed to liquid sulphur dioxide ($SO_2$), when the reaction is carried out under vacuum conditions and temperatures in the range of 1100° to 1300° C.

Another type of operation carried out under vacuum conditions involves decarburization of metal carbides with reduction to the elemental state of the metals of the carbides. The reactions involved in such operations are illustrated by the following general equations:

High-carbon ferrochromium+oxidant=low-carbon ferrochromium+CO gas
High-carbon ferronickel+oxidant=low-carbon ferronickel+CO gas
High-carbon ferromanganese+oxidant=low-carbon ferromanganese+CO gas In treating a carbon-bearing ferro-alloy having a relatively low melting point, such, for example, as a relatively low-chromium high-carbon ferrochromium product having a ratio of chromium to iron (Cr:Fe) suitably low, as, for example, 1.5:1, it is feasible to use the principle hereinbefore mentioned by employing an unbonded reaction mixture consisting essentially of finely divided ferrochromium and an oxidant in excess of the amount required for reaction and heating the reaction mixture under vacuum conditions to effect elimination of carbon, because of the use of excess oxidant which, though it might become molten, is not soluble in the resulting low-carbon or carbon-free ferrochromium product. In such an operation, the temperature employed need not be substantially higher than 1500° C. finally for effective and fast elimination of carbon as carbon monoxide under vacuum and with the production of a ferrochromium-bearing product that can be discharged from the reaction chamber in the liquid state. Any suitable oxidant, or oxidizing agent, may be employed. Finely divided oxidized ferrochromium may be employed advantageously. Oxidized ferrochromium may be produced, for example, by roasting finely divided ferrochromium in the presence of oxygen, at an elevated temperature to convert metallic iron and metallic chromium to oxides of iron and chromium.

The treatment of high-carbon ferronickel may be carried out in much the same manner as the high-carbon ferrochromium treatment, and the oxidant may be, for example, oxidized ferronickel produced in the manner described for the production of oxidized ferrochromium.

Treatment of high-carbon ferromanganese may be carried out by treatment at reduced pressures and suitably elevated temperatures, of an intimate mixture comprising finely divided high-carbon ferro-manganese and finely divided oxidized ferromanganese or finely divided manganese oxide ore.

Substantially pure manganese may be obtained from high-carbon ferromanganese by heating the ferromanganese in the reaction chamber under temperature and pressure conditions similar to those employed in magnesium recovery operations of the invention. The manganese is vaporized, and the manganese vapor is collected and condensed to the solid state. Removal of manganese from the ferromanganese results in the production of a low-manganese ferromanganese product having a melting point higher than that of the ferromanganese initially subjected to treatment and, consequently, liquefaction of the residue may or may not result. The residue may be a solid or a liquid low-manganese ferromanganese product supersaturated with carbon.

A low-manganese high-carbon ferromanganese product can be treated with relatively high-grade manganese ore containing little iron in accordance with the invention to form a high-manganese low-carbon ferromanganese product, which, by virtue of the increased manganese content, may have a melting point lower than that of the initial ferromanganese product.

An agglomerated or briquetted intimate mixture consisting essentially of finely dived high-chromium high-carbon ferrochromium and finely divided oxidized ferrochromium in slight excess may be heated to elevated temperatures at low pressures without melting, in accordance with the invention, to produce a solid low-carbon, or substantially carbon-free, high-chromium ferrochromium product with evolution of carbon monoxide gas only.

An agglomerated or briquetted intimate mixture consisting essentially of finely divided high-carbon ferrochromium and finely divided zinc oxide may be employed advantageously, in accordance with the invention to effect recovery of the zinc of the zinc oxide in elemental form and to produce, simultaneously, a solid product consisting essentially of chromic oxide ($Cr_2O_3$) and medium-carbon ferrochromium when the zinc oxide is employed in the mixing in an amount in excess of that required to oxidize all of the carbon of the high-carbon ferrochromium. The reactions involved are illustrated by the following general unbalanced equation:

$$FeCrC + ZnO = Zn + CO + Cr_2O_3 + FeCrC$$

Operations designed to effect reactions between zinc oxide and high-carbon ferrochromium preferably are carried out at temperatures in the range 1100° C. to 1300° C. and at pressures lower than that equivalent to 100 millimeters of mercury. In such operations, the zinc of the zinc oxide is completely reduced to the elemental state and the vaporized zinc is collected and condensed. The residue, consisting essentially of chromic oxide and medium-carbon ferrochromium is recovered in the solid state from the reaction chamber. The chromic oxide and the medium carbon ferrochromium may be separated by gravity separation means and methods. The amount of chromic oxide produced can be varied by varying the amount of zinc oxide employed.

When low-carbon or substantially carbon-free ferrochromium is a product sought to be produced, the operation described above, involving utilization of the reaction between zinc oxide and high-carbon ferrochromium with the production of metallic zinc and a chromium-bearing product consisting essentially of chromic oxide and medium-carbon ferrochromium, may constitute the first stage of a two-stage operation in the second stage of which the chromic oxide and the medium-carbon ferrochromium of the chromium-bearing product are caused to react somewhat in accordance with the following unbalanced equation:

$$Cr_2O_3 + FeCrC = FeCr + CO$$

In employing such a two-stage operation in accordance with the invention, the zinc oxide and the high-carbon ferrochromium are provided in proportions such that the oxygen combined with zinc (which is completely reduced to the elemental state and eliminated from the reaction chamber) is present in an amount somewhat in excess of that required theoretically to oxidize to carbon monoxide all of the carbon of the high-carbon ferrochromium and just sufficient to oxidize a portion of the chromium of the ferrochromium to produce chromic oxide in an amount sufficient to provide oxygen slightly in excess of that required to oxidize to carbon monoxide all of the carbon contained in the medium-carbon ferrochromium of the chromium-bearing product of the first stage.

In a preferred two-stage process of the invention designated to produce elemental zinc and low-carbon or carbon-free ferrochromium, the first stage is carried out at a temperature in the range, 1100° C. to 1200° C., and at a pressure maintained in the reaction chamber in the range 500 to 1000 microns of mercury; the zinc is reduced to the elemental state and vaporized, and the vaporized zinc is collected in the condenser and condensed therein to the liquid state, in which state it may be withdrawn from the condenser for immediate use or for casting for subsequent use. The second stage of the two-stage operation is carried out after removal of the zinc from the condenser or after separation and removal of the condenser unit, but while the reaction chamber is operatively connected with the vacuum system, at a temperature about 1200° C., for example, in the range, 1200° C. to 1600° C., and at a pressure maintained in the reaction chamber below 300 microns of mercury, for example, in the range 10 to 300 microns.

The method and apparatus of the invention may be employed advantageously in carrying out the relatively simple reaction illustrated by the equation:

$$ZnO + C = Zn + CO$$

commonly utilized in heretofore customary zinc recovery processes. A process of the invention utilizing apparatus of the invention may be carried out at normal atmospheric pressures or at pressures below normal atmospheric pressures with suitable seals provided for preventing the ingress of air from the surrounding atmosphere. Reaction speed may be increased by employing temperatures higher than those employed in heretofore customary zinc recovery processes, or by employing temperatures equivalent to those employed in heretofore customary zinc recovery processes and, at the same time, employing pressures lower than normal atmospheric pressures, or by employing temperatures higher than those employed in heretofore customary zinc recovery processes and, at the same time, employing pressures lower than normal atmospheric pressures. In carrying out such a method of the invention, the maximum charge load that may be introduced into and maintained in position in the rotary reaction chamber of the invention may be employed with advantage to increase production capacity, for the shrinkage of the charge during the course of the process is tremendous, since substantially all of the zinc is vaporized and removed, substantially all of the oxygen combines with carbon and is removed in the form of carbon monoxide, and the residue comprises only excess carbon employed in forming the charge and some impurities and ash present in the zinc oxide-bearing material and carbonaceous material employed in forming the charge. A layer of iron or steel scrap may be employed to function as scavenger for sulphur, in which event the residue may include, also, iron sulphide and excess iron.

The condenser arrangement shown in Fig. 2, of the drawings and described in the specification as being suitable for condensation of liquid metals may be used advantageously for condensing the vaporized zinc to produce a molten or liquid zinc product. In such case, a refractory material such as graphite or carborundum is used in forming the deflector shield and rotor. In operation, the zinc vapor and carbon monoxide gases meet the rotating graphite or carborundum deflector shield and are given a swirling motion outwardly toward the periphery of the condenser chamber by means of the cross-head baffles on the shield. Condenser unit design and cooling arrangements are such that a liquid pool of zinc having a temperature around 500° C. forms in the bottom portion of the condenser, and a liquid sheet or film of zinc of substantial thickness is carried around on the peripheral wall and forms the condensing surface. This liquid sheet or film is renewed continuously in passing through the pool on the bottom. Due to the swirling motion of the zinc vapor and other gaseous reaction products imparted by the rotor, these are forced toward the liquid zinc sheet or film which is maintained relatively cool by controlled dissipation of heat, and the non-condensable gases spill over unto the centrally located exhaust pipe or conduit. A natural separation will be effected through the influence of centrifugal force because of the effect of the rotor vanes in inducing a heavier concentration of zinc vapor along the relatively cold fresh zinc sheet on the rotating wall, which results in forcing the specifically lighter non-condensable gases toward the center of the system, where the exhaust pipe or conduit is located. There will be no tendency on the part of the zinc vapor to condense on the rotor, as the rotor is located in the hottest zone of the condenser system. Since the condensing wall may comprise an area of, say, 100 sq. ft., and rotates at, for example, a speed of 76.5 r.p.m., there will be presented in one minute of time a total condenser surface area equal to 7,650 sq. ft., equivalent to 457,000 sq. ft. or more than 10 acres of condenser surface per hour. Any blue powder that might form will float initially on the surface of the liquid zinc pool and will be caught by the liquid zinc film on the rotating wall and carried around under the influence of centrifugal force, immersed in the pool of liquid zinc and, thereby, effectively eliminated. The peripheral sheet or film of liquid zinc strikes and enters the bottom pool of molten zinc at a peripheral velocity of about 32 feet per second, equivalent to an effective stirring speed of about 22 miles per hour. If the thickness of the peripheral liquid zinc sheet or film should be only one-tenth (1/10) of an inch an amount of molten zinc equivalent to about 100 pounds would be carried around for each complete pass, equivalent to 7650 pounds per minute contributing to circulation and equalization of temperature in the metal. The temperature of the inside of the rotor may be ascertained by inserting a centrally disposed stationary thermocouple into the exhaust pipe or conduit and suitably calibrated to serve as an indicator for aiding in regulating the external cooling means. Control of temperature for condensation within the range, 450° C. to 550° C., usually is preferred, with the specific temperature employed depending upon the cadmium content of the vapors and the pressure employed.

The process and apparatus of the invention offer many obvious advantages over the heretofore customary process for recovering zinc involving reaction of zinc oxide with carbon, particularly those heretofore customary processes that require the utilization of numerous small retorts for accompanying a reasonably satisfactory recovery of zinc. Apparatus of the invention comprising a single reaction chamber unit associated with a heating element unit and suitably sealed against the ingress of air is capable of utilization to accomplish or achieve better recoveries more economically than 50 to 75 or more of the aforementioned small retorts. Charging and discharging operations are relatively simple matters in the utilization of the apparatus of the invention, and these operations may be simplified even further by the preliminary application in a very simple manner to the inner peripheral surface of a thin layer of highly heat-refractory and heat-insulating material such, for example, as carbon, silica and lime, in finely divided form to the inner peripheral surface of the reaction chamber. Such a thin layer performs the functions, among others, of facilitating removal of residues and of protecting the lining of the reaction chamber against corrosion. In certain instances, it may be desirable to apply preliminarily to the inner surface of the reaction chamber a layer of fluxing material for the purpose of forming with a refractory product a suitably fusible slag in order to promote a reaction which, otherwise, might be retarded.

As an incidental or auxiliary advantage, it might be pointed out that a lining may be easily repaired by depositing on the peripheral surface of a damaged lining a layer of finely divided refractory material and thereafter, fusing the layer of refractory material to the damaged lining by the use of heat and vacuum.

The fact that the reaction chamber unit resembles a lathe in structure, arrangement and operation provides for convenience in water-cooling, lubrication of the seals, reboring of the charge and discharge opening, and introduction of a plastic coating material as a seal on the discharge opening, among other desirable or essential, operational and maintenance features.

The condenser assembly of the invention may be utilized as a refining retort or furnace also, by additions to the fluid metal of materials capable of absorbing or reacting with impurities. Processes such, for example, as the Parkes process for desilvering lead, may be conducted therein, or similar refining operations, where advantage is taken of the stirring effect obtained by the rotation at high speed.

It follows logically that for many purposes the combination of reaction chamber, heating element and condenser units is excellently suited for melting and refining of scrap metals, such as lead, antimony, bismuth, zinc, cadmium, brass, aluminum, magnesium, calcium, cast iron and others, as long as it is possible to charge the pieces into the reaction chamber or furnace in an orderly manner to obtain full use of the loading capacity through utilization of centrifugal forces holding the charge in contact with the inner peripheral surface of lining. For most cases of melting scrap, utilization of the closed vacuum reaction chamber or furnace is distinctly advantageous because it avoids the production of objectionable smoke and fumes and dangerous metal vapors, such as of lead vapor.

The reaction chamber furnace may be used advantageously as a melting and refining furnace in conjunction with various metal treating or producing plants such, for example, as steel plants where molten alloys may be required. Thus, for example, the reaction chamber may be utilized for the purpose of adding to a heat of steel a desired amount of chromium in the form of molten low-carbon ferrochromium of any grade.

The melting and refining under vacuum can be timed with precision to coincide in time with the limited period of time usually allowed or available for adding alloying elements to the steel furnace or to a ladle containing molten steel.

For high temperature and high vacuum purposes, the preferred heating element of the invention comprises an outer hollow cylinder of graphite, which may be spray-coated with lampblack dispersed in a water solution of molasses, both interiorly and exteriorly, for optimum heat absorption and heat emission.

For lower temperatures or higher pressures, other materials such, for example, as iron chrome-nickel alloys, stainless steel and Carborundum may be used in fabricating the outer hollow cylinder of the heating element.

For large reaction chambers, the interior cylindrical heating rod of graphite or carbon may be of substantial diameter and may be relieved from thermal stresses by a longitudinal slot, so that the central part is removed a distance of about two-thirds (2/3) to three-quarters (3/4) or more of the total length of the rod. While a single phase heating element has been shown in the drawings, it is to be understood that three-phase electric current may be employed, in which event, of course, three inner rods will be provided in star coupling by means of the outer conducting cylinder with each rod connected to one phase only of the three-phase current, and insulated from each other.

When a very high input of energy is to be employed, it may be desirable to provide an inner rod of sufficiently great cross sectional area relatively to the cross sectional area of the wall of the outer cylinder that the outer cylinder will serve as the main generator of heat, and take the higher drop in voltage in the circuit.

The outer cylinder functions effectively as a gas and vapor seal against vapors of metals, particularly, which might otherwise short circuit the heating element by a vapor current discharge or penetrate to the back of the heating element and cause short-circuiting there.

It is possible to operate without the protecting tube and, instead, to have an electrical contact in the opposite end wall of the reaction chamber through a stationary graphite contact communicating with an outside metal ring collector, but the arrangement described and illustrated is preferred in most cases.

In accordance with the invention, calcium, as well as magnesium may be reduced and recovered from calcined dolomite. In carrying out such a process, silicon is employed in an amount in excess of the amount required for the reduction of magnesium and temperatures are employed approaching, but below the vaporization temperature of silicon (about 1500° C.). Both magnesium and calcium are extremely volatile at a temperature of 1500° C. Magnesium silicide (Mg$_2$Si), also, is extremely volatile at a temperature of 1500° C., but calcium silicide is not highly volatile at that temperature. Volatilization of magnesium silicide can be prevented by applying an innermost protective layer of steel turnings, which will react with the silicide in accordance with the following equation:

$$Mg_2Si + Fe = 2Mg + FeSi$$

Ferrosilicon is not vaporizable under these conditions, and it will liquidize eventually and be found as a molten layer on the lining of the reaction chamber or furnace. Calcium and magnesium vaporized and condensed during the course of the process may be separated by means of suitable fractional distillation processes.

In accordance with the invention, magnesium and aluminum may be recovered from ores such as chrome ores with the production of a residue of low carbon (FeCr) in a matrix of largely silica by reduction of their oxides with silicon.

In the production of an alloy containing chromium and iron and about 45 percent by weight of silicon in a one-step process, involving the smelting of chromite ore $$(Cr_2O_3)(Al_2O_3).(FeO)(MgO)$$

with a carbonaceous reductant, carried out in a submerged arc electric furnace, a considerable amount of magnesium oxide (MgO) and a lesser, but substantial, amount of aluminum oxide (Al$_2$O$_3$) are reduced by silicon and lost in the fumes from the top of the furnace. By employing the method and apparatus of the invention, and operating at a sufficiently high temperature, for example, 1500° C., it is possible to reduce, vaporize and condense magnesium and aluminum in elemental form and obtain a metallic product consisting essentially of magnesium and aluminum as well as a ferrochrome, or a ferrochrome-silicon product, low in carbon or substantially free of carbon.

The invention provides for the production of elemental calcium in accordance with a reaction illustrated by the following equation:

$$CaSi + Fe = Ca + FeSi$$

in order to provide elemental calcium for use, among other purposes or uses, in accordance with a reaction illustrated by the following equation:

$$TiO_2 + 2Ca = Ti + 2CaO$$

to reduce to the elemental state titanium of titanium dioxide with the production of metallic titanium.

In producing metallic titanium in accordance with a process of the invention, metallic calcium from any source may be employed. In accordance with the invention, a charge to be subjected to treatment in the reaction chamber consists essentially of solid titanium dioxide in the form of agglomerates or briquets of suitable size (one-half inch to two inches in greatest dimension, for example), metallic calcium, and a suitable fluxing agent, such, for example, as anhydrous calcium chloride. The charge may be introduced into the reaction chamber in any suitable manner, either in the form of a mixture of components, or through separate addition of the individual components. Preferably, the charge is introduced into the reaction chamber while it is rotating at a speed sufficiently high and in such a manner that solid components of the charge will form a bed or layer of substantially uniform thickness maintained in pressure contact with the inner peripheral surface of the reaction chamber by means of centrifugal force. After the charge has been introduced into the reaction chamber, the reaction chamber unit and the heating element unit are operatively joined with the interior of the reaction chamber sealed against the ingress of air from the surrounding atmosphere and provided with a suitable outlet for gases that might be present. The process may be carried out at atmospheric pressure, or at a pressure above or below atmospheric pressure, but, since satisfactory results can be obtained at atmospheric pressure, the process preferably is carried out at atmospheric pressure, and in an atmosphere of an inert gas such as argon. After the reaction chamber unit and the heating element unit have operatively joined while rotating at the desired rate of speed, heat is applied to the inner surface of the charge to raise its temperature to a temperature above the melting temperatures of calcium chloride and metallic calcium and sufficiently high to initiate a reaction between calcium and titanium dioxide. As the result of the application of heat to the charge, the metallic calcium and the calcium chloride become molten, and a portion of the molten product is maintained in pressure contact with the solid titanium dioxide of the charge, while another portion forms a pool in the bottom portion of the reaction chamber. As the operation proceeds, the layer of agglomerates of titanium dioxide maintained in pressure contact with the inner peripheral surface of the reaction chamber passes continuously into and through the molten pool causing agitation of the liquid of the pool and providing for frequently repeated contact of various portions of the titanium dioxide component of the charge, with a consequent increase in the speed of reaction and a decrease in the time required for reduction to the metallic state of all titanium of the titanium dioxide of the charge. The process of the invention provides a number of advantages over heretofore customary processes employing calcium for reduction of the titanium of titanium dioxide in addition to the advantages resulting from the increase in the speed of reaction and the decrease in time required for carrying out an operation. One substantial additional advantage results from the fact that metallic calcium in the form of large pieces, lumps or crystals may be employed effectively in carrying out a process of the invention, whereas heretofore customary processes require finely divided metallic calcium, which is difficult and costly to produce, and intimate mixing of the finely divided calcium with finely divided titanium dioxide.

The reaction between metallic calcium and titanium dioxide is exothermic in character and, at least partially, self-sustaining, so a relatively small amount of heat need be supplied from an extraneous source, and the rate of supplying heat should be carefully controlled in order to avoid wasteful loss of calcium by vaporization.

After an operation has been completed the reaction chamber will contain a solid phase consisting of metallic titanium and a liquid phase comprising calcium chloride, excess metallic calcium (if an excess is employed) and calcium oxide. The two phases may be separated by pouring off the liquid phase under conditions excluding gases, such as oxygen and nitrogen, and other substances that might contaminate the titanium, or, the entire contents of the reaction chamber may be cooled to a temperature below that at which titanium will react with oxygen or nitrogen, while the reaction chamber remains sealed, before any portion of the contents is removed.

The solid titanium, upon removal from the reaction chamber may be treated for the removal of adhering reaction products and excess calcium and converted into useful industrial forms or shapes in accordance with known procedures.

In carrying out a method in accordance with the invention, calcium may be employed in any suitable amount in excess of the amount required theoretically to reduce to the elemental state titanium of the titanium dioxide. It is advisable to employ metallic calcium in an amount sufficient to insure reduction to the elemental state of all titanium of the titanium dioxide.

The following tables contain a partial summary showing pressure and temperature ranges that may be employed advantageously in carrying out various processes of the invention:

TABLE I.—REDUCTION TO THE ELEMENTAL STATE OF A METAL OF A METAL OXIDE

| | Types of Reducing Materials | Reactions | Temperature Range in Degrees Centigrade | Pressure Range in Microns (Hg) |
|---|---|---|---|---|
| A | Carbonaceous | $ZnO+C=Zn+CO$ | 1,200 to 1,500 | 760,000 (or less). |
| B | do | $Fe_3O_4+6C=3Fe+4CO+2C$ (excess) | 550 to 1,000 | Do. |
| C | Non-Carbonaceous | $4ZnO+3Fe=4Zn+Fe_3O_4$ | 1,100 to 1,300 | 1,000 to 100. |
| D | do | $2MgO+Si=2Mg+SiO_2$ | 1,200 to 1,500 | 300 to 50 (or less). |
| E | do | $3CaO+2Al=3Ca+Al_2O_3$ | 1,200 to 1,350 | Do. |
| F | do | $TiO_2+2Ca=Ti+2CaO$ | 600 to 1,100 | 760,000 (or less). |
| G | do | $2Cr_2O_3+3Si=4Cr+3SiO_2$ | 1,200 to 1,500 | 300 to 50 (or less). |

TABLE II.—REDUCTION TO THE ELEMENTAL STATE OF A METAL OF A METAL CARBIDE

| | Types of Reducing Materials | Reactions | Temperature Range in Degrees Centigrade | Pressure Range in Microns (Hg) |
|---|---|---|---|---|
| A | Oxide of a volatile metal | $Cr_4C+ZnO=4Cr+Zn+CO$ | 1,100 to 1,500 | 1,000 to 100. |
| B | Oxide of a non-volatile metal | $4Cr_4C+Fe_3O_4=16Cr+3Fe+4CO$ | 1,100 to 1,500 | 1,000 to 100. |
| | (Residue of low carbon FeCr may be liquid alloy) | | | |
| C | do | $3Cr_4C+Cr_2O_3=14Cr+3CO$ | 1,100 to 1,500 | 100 to 10. |
| | (Residue of low carbon FeCr may be solid alloy) | | | |

TABLE III.—REDUCTION TO THE ELEMENTAL STATE OF A METAL OF A METAL SULPHIDE

| | Types of Reducing Materials | Reactions | Temperature Range in Degrees Centigrade | Pressure Range in Microns (Hg) |
|---|---|---|---|---|
| A | Metal oxide, of a different metal | $ZnS+Fe_3O_4$ | 1,100 to 1,300 | 1,000 to 100. |
| B | Metal oxide, of same metal | $Cu_2S+2CuO$ | 900 to 1,200 | 1,000 to 100. |
| C | A different metal | $4ZnS+3Fe$ | 900 to 1,300 | 1,000 to 100. |
| D | do | $ZnS+2Cu$ | 900 to 1,300 | 1,000 to 100. |

TABLE IV.—REFINING OF METALS OR ORES BY REMOVAL OF CONTAMINANTS.

| | Type of Treatment | Materials Treated and Reactions | Temperature Range in Degrees Centigrade | Pressure Range in Microns (Hg) |
|---|---|---|---|---|
| A | Heat treatment of molten metal, and vaporization of contaminants. | CuZn (brass) | 900 to 1,300 | 300 to 50. |
| B | do | ZnAgPb (from Parkes process) | 900 to 1,300 | 300 to 50. |
| C | Heat treatment of molten metal and agitation with scavenger agent. | $PbAg+Zn=ZnAgPb$ (Parkes Process) $CaSi+Fe=FeSi+Ca$. | 300 to 500; 1,200 to 1,500 | 760,000. 300 to 50. |
| D | Fractional distillation of metals from molten metals or alloys. | $CaMg=Ca+Mg$ | 650 to 800 | 300 to 50. |
| E | do | $FeMn=Fe+Mn$ | 1,200 to 1,500 | 300 to 50. |
| F | Fractional distillation from solid metals or alloys. | CuZn (brass) | 650 to 850 | 300 to 50. |
| G | Liquefraction in part of solid product, causing low-melting point metal to liquefy. | $CuAgPb=Pb+CuAg$ | 300 to 500 | 760,000. |
| H | Chloridizing operation for removing contaminant. | $Cr_2O_3.FeO+CaCl_2=Cr_2O_3+FeCl_2+CaO$ | 800 to 1,100 | 760,000 (or less). |

TABLE V.—MELTING OF METALS

| | Types of Metals Treated | Specific Metal Treated | Temperature Range in Degrees Centigrade | Pressure Range in Microns (Hg) |
|---|---|---|---|---|
| A | Refractory metals | Low Carbon Ferrochromium Metal. | 1,200 to 1,600 | 300 to 50. |
| B | Relatively low melting point metals and alloys. | Calcium | 800 to 1,000 | 760,000. |
| C | do | Magnesium | 650 to 800 | 760,000. |
| D | do | Aluminum | 650 to 800 | 760,000. |

The invention will be better understood from a consideration of the following description in conjunction with the accompanying drawings in which Fig. 1 is an elevation, partly in section, of a preferred form of apparatus of the invention illustrating individual condenser, reaction chamber and heating element units of the apparatus together with mounting and operative connections provided for combining the individual units into a single unitary operation combination;

Fig. 2 is a fragmentary elevation, partly in section, showing certain modifications in the condenser and reaction chamber units of Fig. 1;

Fig. 3 is a sectional elevation taken substantially along the line 3—3 of Fig. 1;

Fig. 4 is a sectional elevation of the heating element unit shown in Fig. 1;

Fig. 5 is a schematic plan, partly in section, illustrating a preferred arrangement of Figs. 1 to 4 and showing, in addition, means for cooling the electrode of the electrode heating unit and means for permitting removal and replacement of the condenser unit, reaction chamber unit and heating element unit;

Fig. 6 is a perspective of the baffle element employed in the condenser unit of the apparatus shown in Fig. 1;

Fig. 7 is a perspective of the baffle element employed in the condenser unit of the apparatus shown in Fig. 2;

Fig. 8 is a section, on an enlarged scale, of the axially disposed means shown in Fig. 4 for conducting electric current from an outer source of power (not shown) to the interior of the heating element unit;

Fig. 9 is an elevation, partly in section, of a reaction chamber unit and charging means;

Fig. 10 is an elevation of a device for use in discharging a reaction chamber unit; and Fig. 11 is a fragmentary sectional elevation taken substantially along the line 11—11 of Fig. 10.

Figure 1:
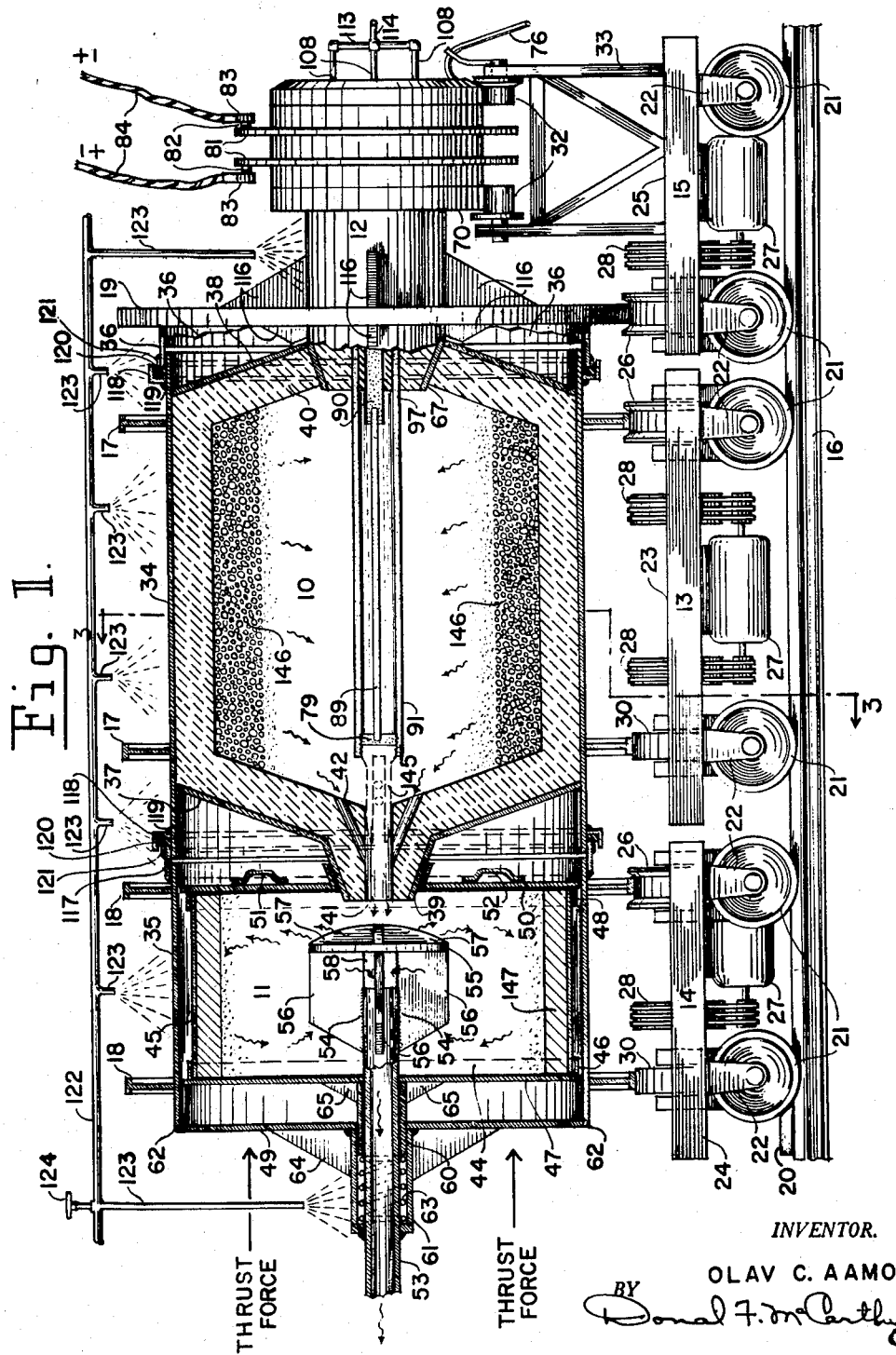

The apparatus shown in the drawings comprises a reaction chamber unit 10, a condenser unit 11 and a heating element unit 12, all cylindrical in cross-section, supported by means of truck units 13, 14 and 15 and annular rings 17, 18 and 19, of identical diameters and circumferences, on parallel rails 16, forming elements of track system, for independent relative movement horizontally. The supporting trucks 13, 14 and 15 are provided with identical wheels 21 mounted on identical forked supports 22 attached to the frames 23, 24 and 25 of the truck units 13, 14 and 15. Metal wedges 20 mounted on the rails 16 in contact with the wheels 21 adjacent the outer end portion of the condenser unit serve to limit movement of the apparatus in the direction of application of force that might result from connection with vacuum equipment. Each of supporting trucks 13, 14 and 15 associated with the reaction chamber unit 10, the condenser unit 11 and the heating element unit 12 is provided with identical grooved driven rollers 26 which have smooth centrally located cylindrical surfaces (Fig. 1), mounted with their axes of rotation lying in a vertical plane containing the axes of rotation of the reaction chamber, condenser and heating element units, and driven by means of variable speed motors 27 and flexible driving units 28 of known construction. The truck 13 which supports the reaction chamber unit and the truck 14 which supports the condenser unit are provided with identical driven rollers 30 having smooth outer cylindrical surfaces of the same diameter and circumference and mounted for rotation about the same horizontal axis as the grooved driven rollers 26. The driven rollers 30 associated with the trucks 13 and 14 having a smooth outer cylindrical surface also are driven by means of variable speed motors 27 and flexible driving units 28.

The motors 27 are electrically connected with a suitable source of electric power (not shown). The wheels 21 of the trucks 13, 14 and 15 may be connected by means of transmission devices (not shown) to make them self-propelling, or independent propelling means such as motorized cars may be employed for moving the trucks and the units mounted thereon to various points on the track system.

The supporting trucks 13, 14 and 15 are provided also with identical idle rollers 31 on opposite sides of the axis of rotation of each of the driven rollers (as shown in Fig. 3). The arrangement of driven and idle rollers 26, 30 and 31 (all supported by suitable bearings, as indicated) and the annular rings, rigidly attached to and forming parts of the various units, is such that the reaction chamber, condenser and heating element units are cradled by means of the annular rings and the idle and driven rollers in such manner that the weights of the various units are so distributed that the driven pulleys may function effectively to rotate the units and the idle rollers, in conjunction with the driven rollers, will function effectively to establish and maintain rotation about a fixed axis. Each of the units 10 and 11 is provided with one set of three smooth cradling rollers and one set of three flanged cradling rollers. The unit 12 is provided with a set of three flanged cradling rollers.

The heating element unit 12 is additionally supported for rotation about a fixed axis in alignment with the axes of the reaction chamber unit and the condenser unit by means of four identical idle rollers 32, two disposed on each side and below the axis of rotation of the unit for rotation about horizontal axes parallel to the axis of rotation of the unit (two only being shown (Fig. 1)) supported on a frame 33 mounted on the supporting truck 15 for the heating element unit and forming a supporting cradle for aiding in maintaining the unit in axial alignment with the reaction chamber unit and the condenser unit.

The three essential units of the preferred complete apparatus of the invention illustrated in the drawings comprise outer cylindrical shells 34 (for the reaction chamber unit), 35 (for the condenser unit) and 36 (for the heating element unit) all formed of sheet steel of the same thickness and all mounted in axial alignment for rotation about a common horizontal axis. The outer shells 34 and 35 of the reaction chamber unit and the condenser unit have identical inner and outer diameters. The outer shell 36 of the heating element unit has an inner diameter substantially equal to the outer diameter of the outer shells of the reaction chamber unit and the condenser unit, and it is mounted in overlapping relationship with respect to the outer shell of the reaction chamber unit.

The drawings show a reaction chamber unit that is cylindrical in shape in its intermediate portion, has end portions 37 and 38 formed of sheet steel that are generally frusto-conical in shape and is provided at one end with a gas outlet opening defined by an outwardly projecting axially aligned frusto-conical portion 39 of the end wall 37 of reduced cross-sectional area, designed to permit a tight seal to be formed with an axially aligned inlet opening in the adjacent wall of the condenser unit, and provided at the other end with an axially aligned opening in the end wall 38 beveled to permit a tight seal to be formed with a removable heating element having a frusto-conical base portion. The opening in the end wall 38 serves as a charging and discharging opening as well as an opening for the insertion of a heating element. The cylindrical intermediate portion and the frusto-conical end wall and gas outlet portions of the reaction chamber are lined with suitable non-metallic refractory material 40 which may consist essentially of clay, magnesite, chromite, carbon or other material, in brick form or in monolithic form, depending upon the nature of the alteration treatment to be carried out and the temperature required for carrying out the alteration treatment.

Two arrangements of gas outlet passages are shown in the drawings. Figs. 1 and 3 show an arrangement comprising a central cylindrical axially aligned passage 41 communicating with the interior of the reaction chamber unit 10 and with the interior of the condenser unit 11 and surrounded by a number of angularly disposed cylindrical passages 42 communicating with the interior of the reaction chamber unit 10 and with the interior of the axially aligned cylindrical passage 41 about midway between its ends. This arrangement permits the insertion of a plug to serve as a steadying support for an end of an electrode when necessary or desirable because of the length or nature of construction of the electrode. Fig. 2 shows a single axially aligned passage 43, similar to the passage 41 (Fig. 1), communicating with the interiors of the reaction chamber 10 and the condenser 11.

Two types of condenser chambers are shown in the drawings. Fig. 1 shows a cylindrical axially aligned chamber 44 comprising a cylindrical sheet metal shell 45 removably mounted in spaced relation to the condenser unit shell 35 on a cylindrical bracket 46 rigidly attached to a circular metal sheet 47, forming an end wall of the condenser chamber, with is circumferential edge surface in sliding contact with the inner cylindrical surface of the condenser unit shell 35 in spaced relationship to the circular metal end wall 49 of the condenser unit. A cylindrical bracket 48, rigidly attached to a circular metal sheet 50, forms the other end wall of the condenser chamber and is removably mounted within the condenser unit shell 35 with its circumferential edge surface in sliding contact with the cylindrical inner surface of the condenser unit shell 35. Metal loops 51 and 52 are attached to the removably mounted end wall 50 of the condenser chamber to facilitate its positioning or insertion and removal.

A baffle and gas outlet conduit assembly comprising a metal conduit 53 and a baffle (shown partly in elevation and partly in sectional elevation in Fig. 1 and shown partly in perspective in Fig. 6) comprising a circular metal plate or disc 55 having metal vanes 56 and 57 rigidly attached to its two plane faces with their faces extending perpendicularly to the faces of the circular disc or plate rigidly mounted as by means of welded joints shown at 54, on an end portion of the conduit 53 but spaced from the end of the conduit to provide a gas outlet passage 58, is mounted in a support comprising a movable sleeve 60 and a closed-end casing 61 rigidly attached to the outer surface of the conduit 53 to form a gas-tight joint and to the end wall 49 of the condenser unit in gas-tight relationship, which end wall 49 is attached along its circumferential edge portion to the end edge of the cylindrical shell 35 of the condenser unit by means of a gas-tight welded joint 62. The sleeve 60 and casing 61 are mounted in telescoping arrangement with the end of the sleeve spaced from the end wall of the casing to provide a chamber for the reception of a helical thrust spring 63. The baffle portion of the baffle assembly is disposed within the condenser chamber with the vanes 57 mounted on its outer face disposed in close proximity to the reaction chamber outlet 41. The conduit portion 53 of the baffle assembly is mounted in bearing contact with the sleeve and projects outwardly through the end wall 47 of the condenser chamber 44, through the end wall 49 of the condenser unit and through the bearing assembly and the helical thrust spring mounted therein to a point of connection, if desired, with a suitable device for receiving non-condensable gaseous reaction products which may include a vacuum pump arrangement (not shown) when an alteration operation is carried out at a pressure below atmospheric pressure. Radially disposed stiffening supports 64 in the form of triangular metal sheets are rigidly attached to the bearing casing 61 and the condenser unit and wall 49 to aid in preventing distortion that might result from variation in temperatures and pressures employed in various operations. Similar radial stiffener supports 65 are so mounted on the end portion of the sleeve 60 adjacent the end wall 47 of the condenser chamber that their outer edge faces and the end face of the sleeve are held in pressure contact with the outer surface of the end wall 47. The condenser and bearing assemblies are mounted in longitudinal axial alignment with the axes of rotation of the condenser unit, reaction chamber unit and heating element unit.

The heating element unit 12 (Fig. 4) comprises an inner sheet metal casing member and an outer sheet metal casing member for mounting an electrode assembly and electrical contact members for delivering current from a power source and for enclosing electrical conductors and cooling elements. The inner casing member is formed with an intermediate cylindrical section 66, a frusto-conical end section 67 which is designed to extend into the charging and discharging opening of the reaction chamber 10 with its outer surface in close-fitting contact with the surface surrounding the charging and discharging opening, and an annular cylindrical flanged opposite end section comprising a cylindrical flange 68 supported by annular web 70 with its outer surface designed for supporting the heating element unit on rollers 32 (Fig. 1) during rotation of the unit and having its axis co-axial with the axes of the cylindrical intermediate section and frusto-conical end section. The annular web 70 is so formed that its two annular surfaces are disposed in planes perpendicular to the axis of the intermediate cylindrical section and the frusto-conical end section.

The outer flanged casing member of the heating element unit is formed with a web 71, having plane surfaces parallel to the plane surfaces of the web 70, supporting a cylindrical flange 72 which, like the flange 68 has an outer surface designed to aid in supporting the heating element unit 12 on rollers 32 (Fig. 1) during rotation of the heating element unit. The flange 72 is provided with a lip 73 extending outwardly from the cylindrical flange 72 and inwardly (toward the axis of the cylindrical sections) from the outer edge portion of the cylindrical flange 72, which lip 73 forms, with the web 71 and the cylindrical flange 72, an annular basin or reservoir 74 for collecting cooling fluid such as water for subsequent disposal. The inner edge of the lip 73 defines a circular opening 75 in the outer casing member, providing access to the interior of the heating element unit. A syphon in the form of a U-shaped tube or pipe 76 is shown with one end portion projecting into the basin 74 and the other end extending outside of and below the basin for the purpose of indicating a form of cooling fluid disposal means. Any suitable form of cooling fluid disposal means that will provide for accomplishment of disposal at a suitable rate may be employed in practicing the invention.

The webs 70 and 71 together with identical tie rods 77 (each threaded at both ends) mounted in circular openings suitably spaced in a circular pattern about the axes of the cylindrical sections comprising the webs, together with identical nuts 78 and washers 80, function as a clamping device for maintaining in suitably insulated gas-tight position an assembly for conducting electric current from an exterior source of electric power (not shown) to the interior of the electrode heating unit for delivery to an electrode through a system of conduits, to be described.

The current conducting assembly comprises two identical annular heavy electrical conducting metal plates 81 (which suitably, may be formed of copper) projecting to points interiorly of the wall of the cylindrical portion of the heating element unit to provide contact elements for connection with conductors within the heating element unit and to points exteriorly of the clamping device comprising the cylindrical flanges 68 and 72 of the inner and outer sections of the heating unit to provide smooth annular plane surfaces for conducting contact with parallel plane faces of identical brushes 82 mounted in identical metal brush holders 83 which, in turn, are electrically connected with identical heavy electrical conductors 84, which, as indicated by arrangements of plus and minus signs are electrically connected with a source of alternating electric current (not shown). The annular heavy metal electrical conducting plates are insulated from each other and from the webs 70 and 71 by means of annular insulating and vacuum-tight, or gas-tight, plates 69 (which may be formed of a suitable plastic material) having openings spaced in a circular pattern identical with that of the openings in the webs and the annular conducting plates.

Interiorly of the heating element unit, the annular conducting metal plates are electrically connected by means of identical heavy metal (copper, for example) conductors 85 to identical outer metal sleeves 86 and a centrally disposed flanged metal sleeve 87, all of which outer sleeves are mounted on tubular metal conductors 88 that are identical in all essential features of construction. The sleeves 86 are mounted directly on the tubular metal conductors 88, while the centrally disposed sleeve 87 is rigidly mounted on a metal nipple 99 having one threaded end which is mounted in a recess in the end portion of the electrode supporting member 90 in threaded engagement therewith.

The tubular metal conductors 88 are provided for the purpose of conducting electric current directly to a resistance heating assembly in the form of a composite electrode comprising an inner solid cylindrical electrode member 89 mounted in threaded engagement at one end with a solid cylindrical supporting rod 90 of larger cross-sectional area and having its opposite end supported in recess formed in a plug element 79 closing the end of a hollow cylindrical electrode member 91 and a sleeve 92 mounted on the inner end portion of the hollow electrode member in threaded engagement therewith and in operative relationship with the outer tubular metal conductors 88 all of the electrode elements being formed of graphite or carbon and all being mounted coaxially with one another and with the electrode unit 12. The heating assembly is insulated from the outer metal casing portions 66 and 67 of the heating element unit by means of a frusto-conical sleeve 93 and a cylindrical sleeve 94, both formed of heat-insulating and electrically non-conducting refractory material which may be the same material as that forming the lining 40 of the reaction chamber, fitting tightly between the outer surface of the outer hollow electrode member and the inner surface of the frusto-conical section 67 and the adjacent portion of the cylindrical section 66 of the heating element unit 12. The graphite or carbon sleeve 92 and the outer tubular metal conductors are insulated from the adjacent portions of the cylindrical section 66 of the heating element unit by means of annular sleeves 95 and 96, formed of Alundum or other suitable insulating material, fitting tightly between the inner surface of the cylindrical metal casing and the graphite sleeve and the tubular metal conductors, respectively.

The solid cylindrical graphite supporting rod 90 is insulated from the outer graphite electrode member by means of a hollow cylindrical sleeve 97 provided at one end with an annular flange, formed of Alundum and so mounted that its inner cylindrical surface is in tight-fitting but sufficiently loose engagement with the outer cylindrical surface of the electrode supporting rod 90 to permit sliding movement, its outer cylindrical surface is in tight-fitting engagement with the adjacent portion of the inner cylindrical surface of the annular cylindrical electrode member 91, and the inner face of its flanged end portion is in tight-fitting engagement with the adjacent end faces of the graphite annular electrode member 91 and the threaded graphite sleeve 92 mounted thereon.

For aiding in maintaining the various elements of the resistance heating assembly in their proper relative positions during the operation of the apparatus, identical spring assemblies comprising spring leaves 98 are rigidly mounted on the outer tubular metal conductors 88 with the spring leaves under compression in contact with the outer end faces of the Alundum insulating sleeves 96 and 97. A more elaborate spring compression device is provided for the centrally disposed tubular metal conductor 88 which functions primarily as a structural element comprising, also, an electrode support 99 which is electrically connected directly to the graphite electrode supporting member 90 in axial alignment therewith. In Fig. 4 of the drawings the spring compression device is shown in substantial detail while the structure of the metal tube 88 has been shown in outline only. The structures of both the tubular metal conductor, or metal tube 88, and the spring compression device are shown in substantial detail in Fig. 8.

The spring compression device associated with the centrally disposed tubular metal conductor 88 and 99 comprises a flanged metal sleeve 87 which serves, also, as a conductor for conducting electric current between the source of supply and the metal sleeve 99 forming a conductor on which it is rigidly mounted, as by welding and which is thereby electrically connected with the electrode support member 99. The flanged portion of the sleeve 87 comprises an outwardly projecting web 100 which supports a cylindrical flange 101 and which, in cooperation with the flange, forms a cup or well forming a seat for one end of a helical spring 102 mounted co-axially with respect to the sleeve 99 and the centrally disposed tubular metal conductor 88. The cylindrical flange 101 also provides means for permitting attachment of a heavy metal conductor in the electrical circuit of the electrode assembly. The other end of the helical spring is seated, while under compression, in a metal cup or well 103 held in position against a metal collar 104 surrounding the cup in contact with the outer face of the bottom of the cup and rigidly attached, as by welding, to the tubular metal conductor 88, the inner end portion of which is mounted in telescoping relationship with the nipple 99 sufficiently loosely to permit some sliding movement of the nipple relatively to the tubular metal conductor 88 and of the electrode supporting member 90 relatively to its surrounding insulating sleeve 97. The end portion of the helical spring that is seated in the well or cup formed by the web 100 and the flange 101 is held in proper alignment by a metal retaining sleeve 105 (Fig. 8) which forms an annular slot for the reception of the end portion of the helical spring. The metal retaining sleeve 105 preferably is anchored against axial movement and rigidly attached to the sleeve 87, or to web 100.

The end portions of the tubular metal conductors 88 adjacent their areas of contact with conductor elements of the electrode assembly are provided with identical internal sealing plugs 106 that provide water-tight seals. The opposite end portions of the tubular metal conductors 88 extend through openings in the web 71 of the outer cylindrical end section of the heating element unit, and the conductors are provided at their extreme outer ends with identical metal caps 107 each of which is sealed in water-tight engagement with its associated tubular metal conductor and each of which is provided with a centrally located circular aperture through which extends a cooling water feed tube 108, formed of electrically non-conducting plastic material, arranged in water-tight relationship with the interior of the tubular metal conductor through means including a packing gland 110 of known construction.

Each of the apertures in the web 71 through which the tubular metal conductors extend is lined with identical sleeves 111 of flexible or plastic non-conducting material such as rubber held rigidly in position with respect to the web and the tubular conductor by means of a clamping device 112 of conventional design.

The plastic cooling water feed tubes 108 have outer diameters smaller than the internal diameters of the tubular metal conductors, and they extend to points adjacent to but spaced from the sealing plugs 106 at the ends of the tubular metal conductors, thus forming an annular hollow chamber within each tubular metal conductor. Cooling water introduced into the plastic tubes 108 through the manifold 113, connected by conventional means with their outer end portions and with a source of supply (not shown) by means of a conduit 114, through a rotating seal (not shown) flows to the remote end portions of the plastic tubes, returns through the annular chamber between the plastic tubes and the tubular metal conductors and is discharged through identical discharge outlets 115 into the collecting basin or reservoir 74.

The inner end portion of the heating element unit 12 adjacent the unit 10 is supported by the annular ring 19 cradled on flanged driven and idle rollers 26 and 31, as hereinbefore pointed out, which rollers are supported for rotation in suitable bearings mounted on the movable truck 15 provided with the variable speed electric motor 27 for driving the driven roller and which may be suitably connected with the wheels of truck 15 to make it self-propelling. The annular ring 19 is rigidly attached to the outer surface of the cylindrical heating element unit casing 66 as by welding. The inner portion or web of the annular ring 19 between its outer bearing surface and its surface of attachment to the casing 66 is provided on opposite sides with radial stiffener supports 116.

When the three main units of the apparatus of the invention (the reaction chamber unit 10, the condenser unit 11 and the heating element unit 12) are mounted in operative positions as shown in Fig. 1, they are provided with circumferential seals closing the spaces adjacent the adjacent end edges of their cylindrical shells 34, 35 and 36 which seal the interiors of the shells against the ingress of air and against the egress of gases formed in the reaction chamber and which permit the maintenance of sub-atmospheric pressures inside reaction chamber and condenser. The circumferential seals comprise, near the end of the apparatus adjacent the heating element unit, the inner end portion of the cylindrical shell 36 of the heating element unit which overlaps the adjacent end portion of the cylindrical shell 34 of the reaction chamber unit in closely-fitting relationship, and, near the end of the reaction chamber unit adjacent the condenser unit, a cylindrical metal band 117 which encircles the cylindrical shell 35 of the condenser unit and is welded thereto, as shown generally by the numeral 119, in gastight relationship and which projects beyond the end edge of the cylindrical shell 35 of the reaction chamber unit in closely-fitting relationship. The circumferential seals include, also, flanged circumferential metal angle iron bands 118, each having a sectional right angle shape, rigidly mounted on the surfaces of the opposite end portions of the outer shell 35 with their web portions extending at right angles to the axis of rotation of the reaction chamber unit and welded to the outer surface of the shell 35, as indicated by the numeral 119, and with their outer cylindrical flanged portions projecting over the adjacent end portions of the heating element shell 36 and the cylindrical metal band 117, forming pockets for the reception of continuous circular rubber (or other suitable plastic) sealing rings 120 which are locked in position partly by means of the shell 36 and the cylindrical metal band 117 and partly by means of tightly-fitting or welded continuous circular metal locking rings or flanges 121. The circular metal locking rings 121 are positioned in close contact with or are welded to or formed integrally with the surface portions of the shell 36 and the metal band 117, but their upper surfaces are spaced from the under surfaces of the cylindrical portions of the flanged circumferential metal bands 118 to provide annular spaces into which the plastic material of the circular sealing rings 120 may expand, if necessary, under the influence of heat and pressure.

For the purpose of dissipating heat reaching the outer surfaces of the apparatus, when necessary or desirable, a fragmentary portion of a water-cooling system is shown in the drawings. The water-cooling system comprises a main supply pipe 122, spray pipes 123 extending from the main supply pipe 122 to points adjacent portions of the apparatus that might require cooling, and a control valve 124 located in the main supply line. Cooling, when desirable or necessary, preferably is accomplished by applying water at a rate such that heat of vaporization largely is utilized and the water employed is completely evaporated, making unnecessary the use of water-collecting equipment. Water may be employed in any desired amount and water-collecting equipment (not shown) may be provided if required.

The condenser unit 11 shown in the apparatus of Fig. 1 is provided with a condenser chamber 44, which may partly be disassembled to remove metal deposit, and baffle and gas outlet assembly designed for the recovery of vaporized metal in the solid state. Fig. 2 shows a condenser chamber and baffle and gas outlet assembly designed for the recovery of vaporized metal in the molten state. The condenser chamber shown in Fig. 2 comprises outwardly converging frusto-conical sheet or cast metal end walls 125 having circumferential edges mounted rigidly to the inner surface of the cylindrical outer shell 35 of the condenser unit 11. The metal end walls 125 and the shell 35 constitute the outer shell of the condenser. The condenser is provided with a lining 129 of suitable non-metallic refractory material, which may be, for example, magnesia, chromite, alumina or silicon carbide or mixtures of two or more of such materials, and which may be monolithic in form or formed of separate shaped units such as bricks.

The apex portion of the outer end wall 125 of the condenser is removably fastened to permit access to the interior of the unit for repair purposes, by means of angular braces 130 mounted by means of bolts on the inner surface of the cylindrical shell 35 with one face of each in contact with the outer face of the other end wall 125 of the condenser.

The baffle and gas outlet assembly of the form of condenser shown partly in elevation and partly in sectional elevation in Fig. 2, and shown partly in perspective in Fig. 7, comprises a tubular graphite conduit 126 having a closed end 127, provided adjacent its closed end with longitudinally extending slots 128 providing passages for the flow of gases through the wall to the hollow interior of the tubular conduit, and graphite discs 131 and 132 mounted on the conduit 126 and held in position by means of set screws 133 and radially disposed graphite vanes 130, each having its inner longitudinal edge portion keyed in a longitudinal groove formed in the outer surface portion of the tubular conduit 126 and each projecting through and fitting tightly in a radially disposed slot in each of the graphite discs 131 and 132. The end portion of the graphite conduit 126 opposite the closed end is reduced in size and threaded externally, as indicated by the numeral 134, to provide for forming a gastight threaded connection with an internally threaded metal pipe or conduit 135 having an external diameter identical with that of the graphite conduit 126.

The baffle portion of the baffle and gas outlet assembly is mounted within the condenser chamber with the closed end of the graphite tubular conduit disposed in close proximity to the reaction chamber outlet 43 and with the reduced and threaded end portion 134 of the conduit 126, projecting outwardly through the end wall 125 of the condenser chamber and the end wall 143 of the condenser unit, which is attached to the circumferential edge of the shell 35 by means of a gas-tight welded joint 149 into threaded engagement with the metal conduit 135.

The outer end portion of the metal conduit 135 communicates with a stationary metal conduit 136 forming part of a vacuum system (not shown) through a packing gland comprising an outer cylindrical metal casing 138 formed integrally with the conduit 136 and having a flanged outer end 139. The packing gland comprises an inner metal liner 137 providing an inner bearing surface for the conduit, an outer metal liner 141 providing an outer bearing surface for the conduit 135, having a flanged outer end which is mounted in bolted engagement with the flanged portion of the casing 138, as indicated by the numeral 142, and an intermediate liner 140 comprising oil-soaked fibrous material which functions to provide a gas-tight joint between the shell 138 and the conduit 135 under influence of pressure created by the bolts 142. Radially disposed stiffening supports 144 in the form of triangular metal sheets are rigidly attached by welding to the outer surface of the metal conduit 135 and the end wall 143 of the condenser unit to aid in preventing distortion. The condenser, gas outlet and bearing assemblies are mounted in longitudinal axial alignment with axes of rotation of the condenser unit, reaction chamber unit and heating element unit.

The apparatus shown in Figs. 1 and 4 illustrate two forms of electrode elements hereinbefore referred to briefly. In each of Figs. 1 and 4, the electrode assembly is shown as comprising an outer graphite casing 91 internally threaded at one end and provided at this end with a closure plug 79 formed of graphite and provided with a recess in its inner surface portion for receiving, supporting and contacting electrically the relatively slender graphite electrode 89. Fig. 4 shows an extension plug 145 in fragmentary sectional elevation formed of graphite and externally threaded for engagement with the internally threaded end portion of the electrode casing 91. The extension plug is shown in dotted lines in Fig. 1 to indicate that its use is optional.

Fig. 1 illustrates conditions existing within the reaction chamber and the condenser during the course of operation of a process involving reduction to the elemental state of the metal of a compound, vaporization of the element produced and collection and recovery of the vaporized metal in the solid state. The charge 146 of solid agglomerates comprising a compound of the metal to be reduced is maintained by means of centrifugal force in the form of layers of substantially uniform thickness in peripheral contact with the inner surface of the lining 40 of the reaction chamber, and it is confined in the chamber in fixed position with respect to the lining throughout the operation. The apparatus, as a composite unit, is completely sealed against the ingress and egress of gases other than through the outlet conduit 53 which may be operatively connected with a vacuum system (not shown) or which, because of characteristics of the particular process being employed, may be open to the atmosphere or merely provided with a liquid seal comprising water or other suitable liquid. Heat is radiated from the electrode assembly directly to the charge and substantially uniformly to all portions of the charge. All gaseous reaction products created within the reaction chamber pass through the outlet 41, into contact with the baffles 57 of the baffle assembly and, thence, under the influence of centrifugal force into contact with the peripheral surface of the condenser chamber. The condenser chamber is so constructed, and it is cooled at such a rate, that condensable metal vapors are chilled, deposited and solidified to form a solid, annular deposit of metal 147. Non-condensable gaseous products, such as oxides of carbon or low boiling point metal vapors, that might be formed in some processes, pass through the slots 58 to the interior of the outlet conduit 53 and through the outlet conduit 53 to a vacuum system or to any other suitable disposal or collecting means.

Operation of apparatus employing a condenser chamber of the type illustrated in Fig. 2 is essentially the same as operation of apparatus of the type shown in Fig. 1, except that the structure employed provides heat insulating material to inhibit dissipation of heat contained in the vaporized metal collected to permit its recovery in the liquid state.

The paths of flow or travel of gases are indicated by means of arrows having sinuous shafts appearing in Figs. 1 and 2.

The molten metal 148 collected in the condenser forms a pool on the bottom of the condenser and a continuous layer held by centrifugal force in peripheral contact with the inner peripheral surface of the lining 129 of the condenser. As shown, the peripheral layer of molten metal is of substantial thickness throughout, but, under the conditions of operation, most of the liquid metal will remain on the bottom of the condensing chamber. At higher speeds of rotation than that illustrated by the illustration, a heavier layer of liquid will be held to the peripheral lining.

Thrust forces (indicated by the legends and arrows on Figs. 1 and 2) may be provided in any suitable manner if necessary or desirable for counteracting or neutralizing forces that might result from connection of the apparatus with vacuum systems.

Figure 5 is a plan of an arrangement (partly in detail, partly schematically, and partly in section) showing means for separating and separately moving the condenser, reaction chamber and heating element units and including means for protecting the hot electrode assembly against deterioration resulting from too rapid cooling and from oxidation between periods of use. Such means include a turntable 159 having thereon tracks or trails 16 forming part of a plant rail system onto which the heating element unit 12 may be moved when disengaged from the reaction chamber, and a cooling chamber 150 into which the electrode assembly may be moved along continuing rails of a plant rail system after turning the turntable through an angle of 180°. The cooling chamber is provided at one end with a flanged wall having a centrally located opening through which the heating element assembly may project and having a peripheral flange which may cooperate with the peripheral shell or flange 36 of the heating element unit in forming a gas-tight seal of the type formed between the shell or flange 36 heating element unit and the peripheral shell 34 of the reaction chamber unit, as illustrated by the numerals 36 and 118 to 121 in Fig. 1. The opposite end wall of the cooling chamber 150 is sealed in gas-tight relationship to the peripheral portion of the adjacent end of the cooling chamber and the interior of the cooling chamber may be operatively connected with a vacuum system, indicated generally by the numeral 151. Suitable means indicated by legends and arrows, may be employed for providing thrust forces for neutralizing oppositely directed forces created by utilization of the vacuum system. The electrode unit cooling chamber may be a stationary structure or it may be a structure mounted on a truck and wheels (not shown) for movement on tracks or rails 16 of a plant rail system.

When the heating element unit has been moved to the position in which the electrode assembly is disposed in the cooling chamber 150, the reaction chamber unit may be moved through the agency of the turntable and tracks or rails 16 forming part of the plant rail system to a point at which solid residue or treated molten metal or liquid residue may be discharged. At the same time that the reaction chamber unit is moved to a point at which solid residue may be discharged, the condenser unit may be discharged of its contents by bringing up on the rail system a suitable collection car. The condenser unit and its condenser chamber may be of such sizes, for collecting solid metal particularly, as to be capable of condensing metal vapor produced in the treatment of several charges, in which case the reaction chamber unit containing charge residue and the heating element unit are separated and a new reaction chamber unit containing a fresh charge may be moved into operative position with respect to the condenser unit. The heating element unit is moved into operative position with respect to the reaction chamber unit, and the three units are sealed against the ingress of gas and the egress of gas except through the gas outlet associated with the condenser chamber, and a new operation is commenced. In the delay time between successive runs, the vacuum system, if one is employed, is in closed-off position until the units are re-assembled, when its operation is resumed.

Preferably, the three rotary units are assembled for operation while each is operating at the same speed of rotation, which procedure is provided for by the provision of separate driving means for each unit, the provision of synchronous driving motors and the provision of carefully machined and aligned driving and driven rollers and annular rings of identical sizes, respectively.

Removal of solidified metal from a condenser unit 11 (Fig. 1) may be accomplished by removing the end wall 50 and forcing the annular deposit of metal 147 held by the metal cylinder 45 through the open end of the condenser chamber 44.

Removal of liquid metal from a condenser unit may be accomplished preferably by suction means or through a syphon tube discharging the molten metal into a suitable receptacle (not shown) through the opening in the inner end wall through which the reduced frusto-conical portion of the reaction chamber unit extends, as is previously known and practiced.

Charging of a reaction chamber preferably is carried out by depositing the charge material gradually and evenly within the reaction chamber while the speed of rotation of the reaction chamber is such that centrifugal force greater than the force of gravity is exerted on all portions of the charge and charge material deposited therein is maintained in pressure contact with and in fixed position with respect to the inner peripheral surface of the reaction chamber. This procedure may be carried out advantageously by gradually increasing the rate of rotation of the reaction chamber, through adjustment of the speed of the variable speed motor 27, in order gradually to increase the centrifugal force exerted at radial points closer to the axis of rotation thus to fix the various layers in position gradually as charging proceeds. Gradual and even introduction into the reaction chamber of solid charge material in crushed, finely divided or agglomerated form insures the production of a charge maintained in pressure contact with and in fixed position with respect to the inner peripheral surface of the reaction chamber, which is of substantially uniform thickness and tubular in shape with an inner cylindrical surface co-axial with axis of rotation of the reaction chamber. The provision of such a charge permits direct application of heat to the charge from the heat source illustrated which has its zone of greatest intensity in the region of the axis of the cylindrical charge with the result that heat energy is delivered to the charge rapidly, efficiently and substantially uniformly with consequent promotion of efficiency of reaction of the components of the charge.

Fig. 9 of the drawings illustrates means for charging a reaction chamber gradually and evenly. Charging is carried out while the reaction chamber is rotating at a fixed speed or at gradually increasing speed sufficiently great that centrifugal force sufficiently greater than the force of gravity ultimately to maintain all of the charge introduced in pressure contact with the peripheral surface of the reaction chamber is developed immediately or gradually.

The charging means illustrated in Fig. 9 comprises a screw conveyor including a cylindrical casing 152 provided at one end with a side-bottom discharge opening, as illustrated, and communicating with a charge feed hopper 158 mounted on a vertical post 153 carried by a truck supported on rails 16, forming part of a rail system by means of supports 155 and wheels 154. The truck is provided with reversible driving means including a motor 156 operatively connected with the rear wheels 154 of the truck by means of a driving chain 157. Operation of the truck motor 156 and its associated driving means is controlled through operation of a foot treadle 162 by an operator. The screw conveyor is driven by an electric motor 161 having a hand-operated control mechanism 161 associated therewith. The truck carrying the screw conveyor may be operated to introduce the screw conveyor into the interior of the reaction chamber 10 through its charging and discharging opening and to move the discharge end of the conveyor repeatedly longitudinally between the inner ends of the reaction chamber. The screw conveyor may be operated to introduce charge material into the interior of the reaction chamber as the discharge end portion of the screw conveyor is moved repeatedly between the opposite inner ends of the reaction chamber and while the reaction chamber is being rotated by its driving motor 27 at a desirable rate of speed or at gradually increasing rates of speed.

Figs. 10 and 11 illustrate apparatus that may be employed for discharging the contents of a rotary reaction chamber. The discharging apparatus shown in Figs. 10 and 11 comprises four heavy vertical steel girders 167 anchored at points on a ladle or receptacle level below the level of the plant rail system and rigidly joined together by four similar horizontally extending girders 167, to form a frame having two rectangular sides substantially longer than the length of the reaction chamber unit 10, and two rectangular sides substantially wider than the width of the reaction chamber unit 10. On the sides of the frame parallel to the length of the reaction chamber, vertically extending circular tracks 166 having radially arranged flanged rollers 165 mounted thereon are rigidly attached to the vertical girders by means of heavy bolts or rivets 169. A circular carrier 163 is mounted on the flanged rollers 165 for rotation through an arc of a circle having a length determined by the length of an arcuate rack 164, attached to the carrier, which is operatively associated with a pinion 170, associated with a driving mechanism 168 and which has a limiting stop element 171 formed integrally therewith. Sections of rails 16, separable from the rails 16 of the general plant rail system leading to the frame structure are rigidly attached to the carriers 163 shown in Figs. 10 and 11 of the circular tracks attached to the opposite sides of the frame. A vertically movable frame 174 carrying two sets of flanged cradling rollers, each consisting of three rollers, is supported by chains or cables 175 leading to a chain block or to a crane (not shown) adjacent the top or upper portion of the frame structure. The rail sections 16 supported on the rotatable carrier 163 for movement therewith are adapted to receive a reaction chamber unit to be discharged, together with its supporting truck and wheel assembly. When a reaction chamber unit is moved into position on track or rail section supported by the rotary carrier it is blocked against movement by the application to the rail sections of wheel blocking clamps 172, and by lowering the frame 174 to a position in which its flanged rollers contact the annular rings 17 of the reaction chamber in cradling engagement, in which position it is locked in engagement with the rotary carrier 163 by means of removable bolts 176. With the reaction chamber unit thus locked against forth and back movement the rack and pinion rotating mechanism is actuated by the pinion driving mechanism 168 to tilt the reaction chamber unit through an angle of nearly 90° (as indicated by the dotted line structure shown in Fig. 10). As the reaction chamber unit is tilted, it reaches a point at which discharging into a receptacle or ladle 177 provided with wheels 178 commences, and, as tilting proceeds, discharging is completed. When only solid material is being discharged, the reaction chamber unit preferably is rotated continuously about its longitudinal axis by operation of the driving motor 27.

Where, herein I have referred to specific processes, it should be understood that those references were included by way of providing an understanding and an interpretation of the invention and not by way of limitation.

For example, when I have spoken (or written) of the reduction of a metal from its metal compound to a lower state of oxidation, it was my intention to include, for example, reduction of the metal to a lower state of oxidation that is or might be and not necessarily would be the elemental state or a lower state. Thus, for example, I contemplated various degrees or stages of reduction of metals of various oxidized compounds such, for example, as reduction, by means of carbonaceous material such as titanium dioxide to titanium sesqui-oxide, or to titanium monoxide. Many other highly oxidized metallic elements may be reduced to lower states of oxidation in accordance with my invention. Thus, to provide another example, manganese dioxide ($MnO_2$) may be subjected to the action of a carbonaceous reducing agent at a suitable elevated temperature to produce manganous oxide ($MnO$).

I claim:

1. A metallurgical process which comprises introducing into a rotary reaction chamber a charge comprising components capable of reacting at an elevated temperature with the production of a product comprising metal in elemental form, rotating the reaction chamber at a speed sufficiently high that centrifugal force greater than the force of gravity is exerted on all portions of the charge, whereby charge material is maintained in pressure contact with and in fixed position with respect to the inner peripheral surface of the reaction chamber and a charge tubular in shape and having an inner substantially cylindrical surface is formed, inserting a source of heat energy into the cylindrical cavity formed by the inner surface of said charge while simultaneously substantially sealing said rotating reaction chamber against the ingress of air, heating the charge by direct application of heat to its inner surface from said source of heat energy to a temperature sufficiently high to effect reaction between its components, and recovering a product comprising metal in elemental form.

2. A metallurgical process which comprises introducing a charge comprising solid components capable of reacting at an elevated temperature to produce metal in elemental form into a rotary reaction chamber while rotating the reaction chamber at a speed sufficiently high that centrifugal force greater than the force of gravity is exerted on the material of the charge as it is deposited within the reaction chamber, whereby charge material is maintained in contact with and in fixed position with respect to the inner peripheral surface of the reaction chamber and a charge of substantially uniform thickness, tubular in shape and having an inner substantially cylindrical surface co-axial with the axis of rotation of the rotary reaction chamber is formed, inserting a source of heat energy into the cylindrical cavity defined by the inner surface of said charge while simultaneously sealing said rotating reaction chamber against the ingress of air, heating the tubular charge to a temperature sufficiently high to effect reaction between its components with the production of metal in elemental form by direct application of heat to its inner cylindrical surface by means of said heat source, whereby heat energy is delivered to the charge rapidly, efficiently and substantially uniformly, and efficiency of reaction of the components of the charge is promoted, and recovering a product comprising metal in elemental form.

3. A metallurgical process which comprises introducing a charge comprising solid components capable of reacting at an elevated temperature to produce elemental metal in vapor form into a rotary reaction chamber while rotating the reaction chamber at a speed sufficiently high that centrifugal force greater than the force of gravity is exerted on the material of the charge as it is deposited within the reaction chamber, whereby charge material is maintained in contact with and in fixed position with respect to the inner peripheral surface of the reaction chamber and a charge of substantially uniform thickness, tubular in shape and having an inner substantially cylindrical surface co-axial with the axis of rotation of the rotary reaction chamber is formed, inserting a source of heat energy into the cylindrical cavity defined by the inner surface of said charge while simultaneously sealing one end of said rotating reaction chamber against the ingress of air, mounting a condenser unit against said rotating retort in communication with said rotary reaction chamber while simultaneously sealing the other end of said chamber against the ingress of air, heating the tubular charge to a temperature sufficiently high to effect reaction between its components with the production of elemental metal in vapor form by direct application of heat to its inner cylindrical surface by means of said heat source, whereby heat energy is delivered to the charge rapidly, efficiently and substantially uniformly, and efficiency of reaction of the components of the charge is promoted, and collecting the metal vapor by condensing the same within said communicating condenser unit.

4. A metallurgical process which comprises introducing a charge comprising solid components capable of reacting at an elevated temperature to produce metal in elemental form into a rotary reaction chamber while rotating the reaction chamber at a speed sufficiently high that centrifugal force greater than the force of gravity is exerted on the material of the charge as it is deposited within the reaction chamber, whereby charge material is maintained in contact with the inner peripheral surface of the reaction chamber solely by means of centrifugal force and a charge of substantially uniform thickness, tubular in shape and having an inner substantially cylindrical surface co-axial with the axis of rotation of the rotary reaction chamber is formed, inserting a source of heat energy into the cylindrical cavity defined by the inner surface of said charge while simultaneously sealing said rotating reaction chamber against the ingress of air and providing a limited opening for egress of gaseous reaction products therefrom, heating the tubular charge to a temperature sufficiently high to effect reaction between its components with the production of metal in elemental form by direct application of heat to its inner cylindrical surface by means of said heat source, whereby heat energy is delivered to the charge rapidly, efficiently and substantially uniformly, and efficiency of reaction of the components of the charge is promoted, and recovering a product comprising metal in elemental form.

5. A metallurgical process which comprises introducing a charge comprising solid components capable of reacting at an elevated temperature to produce metal in elemental form into a rotary reaction chamber while rotating the reaction chamber at a speed sufficiently high that centrifugal force greater than the force of gravity is exerted on the material of the charge as it is deposited within the reaction chamber, whereby charge material is maintained in contact with the inner peripheral surface solely by means of centrifugal force and a charge of substantially uniform thickness, tubular in shape and having and inner substantially cylindrical surface co-axial with the axis of rotation of the rotary reaction chamber is formed, inserting a source of heat energy within the cylindrical cavity defined by the inner surface of said charge, sealing the reaction chamber while under sustained rotation against the ingress of air and operatively connecting said chamber with means for withdrawing gaseous reaction products and maintaining a pressure lower than atmospheric pressure in its interior, heating the tubular charge to a temperature sufficiently high to effect reaction between its components with the production of metal in elemental form by direct application of heat to its inner cylindrical surface by means of said heat source, whereby heat energy is delivered to the charge rapidly, efficiently and substantially uniformly, and efficiency of reaction of the components of the charge is promoted, and recovering a product comprising metal in elemental form.

6. A metallurgical process for recovering magnesium which comprises introducing a solid charge comprising magnesium oxide-bearing material and reducing material capable of reacting at an elevated temperature to produce elemental magnesium in vapor form into a rotary reaction chamber while rotating the reaction chamber at a speed sufficiently high that centrifugal force greater than the force of gravity is exerted on the material of the charge as it is deposited within the reaction chamber, whereby charge material is maintained in contact with the inner peripheral surface and a charge of substantially uniform thickness, tubular in shape and having an inner substantially cylindrical surface co-axial with the axis of rotation of the rotary reaction chamber is formed, inserting a source of heat energy within the cylindrical cavity defined by the inner surface of said charge, sealing the reaction chamber while under sustained rotation against the ingress of air and operatively connecting said chamber with means for withdrawing gaseous reaction products and maintaining within the reaction chamber a pressure lower than atmospheric pressure, heating the tubular charge to a temperature sufficiently high to effect reaction between its components with the production of elemental magnesium in vapor form by direct application of heat to its inner cylindrical surface by means of said heat source, to its inner cylindrical surface by means of said heat, whereby heat energy is delivered to the charge rapidly, efficiently and substantially uniformly, and efficiency of reaction of the components of the charge is promoted, and withdrawing and collecting magnesium vapor produced in the interior of the reaction chamber.

7. A metallurgical process for recovering calcium which comprises introducing a solid charge comprising calcium oxide-bearing material and non-carbonaceous reducing material capable of reacting at an elevated temperature to produce elemental calcium in vapor form into a rotary chamber while rotating the reaction chamber at a speed sufficiently high that centrifugal force greater than the force of gravity is exerted on the material of the charge as it is deposited within the reaction chamber, whereby charge material is maintained in contact with the inner peripheral surface and a charge of substantially uniform thickness, tubular in shape and having an inner substantially cylindrical surface co-axial with the axis of rotation of the rotary reaction chamber is formed, inserting a source of heat energy within the cylindrical cavity defined by the inner surface of said charge, sealing the reaction chamber while under sustained rotation against the ingress of air and operatively connecting said chamber with means for withdrawing gaseous reaction products and maintaining within the reaction chamber a pressure lower than atmospheric pressure, heating the tubular charge to a temperature sufficiently high to effect reaction between its components with the production of elemental calcium in vapor form by direct application of heat to its inner cylindrical surface by means of said heat source, whereby heat energy is delivered to the charge rapidly, efficiently and substantially uniformly, and efficiency of reaction of the components of the charge is promoted, and withdrawing and collecting calcium vapor produced in the interior of the reaction chamber.

8. A metallurgical process for treating a carbide of a metal of the group consisting of chromium, manganese, nickel, titanium, molybdenum, tungsten, vanadium, zirconium and hafnium to form a product comprising metal of the carbide in elemental form and relatively low in carbon which comprises introducing into a rotary reaction chamber a solid charge comprising finely divided intimately mixed metal carbide and an oxide of the metal of the carbide capable of reacting at an elevated temperature with the production of a solid product comprising metal of the carbide and the oxide in elemental form and a gaseous oxide of carbon, rotating the reaction chamber at a speed sufficiently high that centrifugal force greater than the force of gravity is exerted on all portions of the charge, whereby charge material is maintained in pressure contact with the inner peripheral surface of the reaction chamber and a charge tubular in shape and having an inner substantially cylindrical surface is formed, inserting a source of heat energy into the cylindrical cavity defined by the inner surface of said charge while simultaneously sealing said rotating reaction chamber against the ingress of air and providing a limited opening for egress of gaseous reaction products therefrom, heating from said source of heat energy the charge by direct application of heat to its inner surface to a temperature sufficiently high to effect reaction between its components with the production of metal of the carbide and oxide in elemental form and a gaseous oxide of carbon, withdrawing the gaseous oxide of carbon from the interior of the reaction chamber, and recovering a product comprising metal of the carbide in elemental form.

9. Apparatus for operation in carrying out high temperature metallurgical processes comprising a rotatably mounted reaction chamber provided with charging and discharging means, means for heating charge material contained in the reaction chamber to a temperature at which desired alteration of the charge may be effected, including retractable electric heating means disposed axially within the reaction chamber and so mounted as to be capable of rotation in synchronism with the reaction chamber, means for rotating the reaction chamber at a speed sufficiently high that centrifugal force greater than the force of gravity may be exerted on a charge disposed within the reaction chamber, whereby charge material may be maintained in pressure contact with and in a fixed position with respect to the inner peripheral surface of the reaction chamber during the course of a metallurgical process.

10. Apparatus for operation in carrying out high temperature metallurgical processes comprising a rotatably mounted reaction chamber provided with charging and discharging means, means for heating charge material contained in the reaction chamber to a temperature at which desired alteration of the charge may be effected, including an electric resistance heating element retractably disposed within the reaction chamber extending along a major portion of the axis of rotation of the reaction chamber and so mounted as to be capable of rotation in synchronism with the reaction chamber, means for sealing the reaction chamber against the ingress of air from the surrounding atmosphere while in operation, an outlet for gaseous reaction products communicating with the interior of the reaction chamber, means for rotating the reaction chamber at a speed sufficiently high that centrifugal force greater than the force of gravity may be exerted on a charge disposed within the reaction chamber, whereby charge material may be maintained in pressure contact with and in a fixed position with respect to the inner peripheral surface of the reaction chamber during the course of a metallurgical process.

11. Apparatus for operation in carrying out high temperature metallurgical processes comprising a reaction chamber mounted for rotation about a horizontal axis provided with charging and discharging means, means for heating charge material contained in the reaction chamber to a temperature at which desired alteration of the charge may be effected, including an electric resistance heating element retractably disposed within the reaction chamber extending along a major portion of the axis of rotation of the reaction chamber and so mounted as to be capable of rotation in synchronism with the reaction chamber, means for sealing the reaction chamber against the ingress of air from the surrounding atmosphere while in operation, a condenser for metal vapors communicating with the interior of the reaction chamber so mounted in axial alignment with the reaction chamber as to be capable of rotation in synchronism with the reaction chamber and the heating means, means for rotating the reaction chamber at a speed sufficiently high that centrifugal force greater than the force of gravity may be exerted on a charge disposed within the reaction chamber, whereby charge material may be maintained in pressure contact with and in a fixed position with respect to the inner peripheral surface of the reaction chamber during the course of a metallurgical process.

12. A metallurgical process for altering titanium dioxide which comprises introducing into a rotary reaction chamber a solid charge comprising titanium dioxide-bearing material and reducing material capable of reacting at an elevated temperature with the production of a product comprising titanium in a lower state of oxidation, rotating the reaction chamber at a speed sufficiently high that centrifugal force greater than the force of gravity is exerted on all portions of the charge, whereby charge material is maintained in pressure contact with the inner peripheral surface of the reaction chamber and a charge tubular in shape and having an inner substantially cylindrical surface is formed, inserting a source of heat energy into the tubular opening defined by the inner surface of said charge while simultaneously sealing said rotating reaction chamber against the ingress of air and providing a limited opening for egress of gaseous reaction products therefrom, heating the charge by direct application of heat to its inner surface from said source of heat energy to a temperature sufficiently high to effect reaction between its components with the production of titanium in the form of titanium monoxide, and recovering a product comprising titanium monoxide.

References Cited in the file of this patent
UNITED STATES PATENTS

| | | |
|---|---|---|
| 1,449,834 | Pehrson | Mar. 27, 1923 |
| 2,087,347 | Larsen | July 20, 1937 |
| 2,091,087 | Wempe | Aug. 24, 1937 |
| 2,159,910 | Seliger et al. | May 23, 1939 |
| 2,566,548 | Beauchasne et al. | Sept. 4, 1951 |
| 2,584,808 | Newhouse | Feb. 5, 1952 |
| 2,637,649 | Handwerk et al. | May 5, 1953 |